(12) United States Patent
Ushioda et al.

(10) Patent No.: US 6,365,689 B1
(45) Date of Patent: Apr. 2, 2002

(54) PROPYLENE/ETHYLENE RANDOM COPOLYMER, MOLDING MATERIAL, AND MOLDED ARTICLE

(75) Inventors: Tsutomu Ushioda; Jun Saito; Mototake Tsutsui; Yoshitoyo Yasuda; Hiroyuki Fujita; Yoshiyuki Oogi; Minoru Adachi; Yoshitaka Morimoto; Taketo Hirose; Youichi Kugimiya; Yasuhiro Shiraishi, all of Ichihara (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/485,618
(22) PCT Filed: Aug. 13, 1998
(86) PCT No.: PCT/JP98/03612
 § 371 Date: Feb. 15, 2000
 § 102(e) Date: Feb. 15, 2000
(87) PCT Pub. No.: WO99/09079
 PCT Pub. Date: Feb. 25, 1999

(30) Foreign Application Priority Data

Aug. 15, 1997 (JP) ............................................... 9-220335
Aug. 15, 1997 (JP) ............................................... 9-220336
Aug. 28, 1997 (JP) ............................................... 9-231930
Sep. 19, 1997 (JP) ............................................... 9-254409

(51) Int. Cl.$^7$ ................................................. C08F 4/42
(52) U.S. Cl. .................... 526/160; 526/348; 526/348.1; 526/351; 526/184; 526/943
(58) Field of Search ............................. 526/348, 348.1, 526/351, 184, 160, 943

(56) References Cited

U.S. PATENT DOCUMENTS 4,252,906 A * 2/1981 Hosokawa et al. ............ 521/86

FOREIGN PATENT DOCUMENTS

EP 0 629 631 A2 12/1994
EP 629631 12/1994

(List continued on next page.)

OTHER PUBLICATIONS

"Carbon–13 Nuclear Magnetic Resonance Determination of Monomer Composition and Sequence Distributions in Ethylene–Propylene Copolymers Prepared with a Stereoregular Catalyst System", G. J. Ray et al., Ethylene–Propylene Copolymers, vol. 10, No. 4, Jul.–Aug. 1977, pp. 773–778.

(List continued on next page.)

Primary Examiner—David W. Wu
Assistant Examiner—Ling-Siu Choi
(74) Attorney, Agent, or Firm—McDermott, Will & Emery

(57) ABSTRACT

The present invention provides propylene/ethylene random copolymers characterized in that:
 an ethylene content (Ew) is 0.1–10 wt %,
 a relationship between an isolated ethylene content ($E_1$) and the ethylene content (Ew) is represented by the following equation $$E_1 > 0.85 - 0.01\ Ew$$

2,1- and 1,3-propylene units present in a polymer chain are 0–1 mol %,
 a weight average molecular weight (Mw) is in the range of 40,000–1,000,000, and
 a ratio (Mw/Mn) of the weight average molecular weight (Mw) to a number average molecular weight (Mn) is in the range of 1.5–3.8.

The copolymers are suitable for a base resin for a molding material for the production of a wide variety of molded articles which are high in randomness and excellent in stiffness, heat resistance and transparency.

20 Claims, 4 Drawing Sheets

FOREIGN PATENT DOCUMENTS

| | | | |
|---|---|---|---|
| EP | 0 890 590 A1 | | 1/1999 |
| JP | 56-143207 | | 11/1981 |
| JP | 5-9225 | | 1/1993 |
| JP | 5-32723 | | 2/1993 |
| JP | 7-10932 | | 1/1995 |
| JP | 7-149833 | | 6/1995 |
| JP | 8-073532 | | 3/1996 |
| JP | 8-238729 | | 9/1996 |
| JP | 9-048040 | | 2/1997 |
| JP | 9-048858 | | 2/1997 |
| JP | 09 110934 | * | 4/1997 |
| JP | 9-110934 | | 4/1997 |
| JP | 9-151214 | | 6/1997 |
| WO | WO 9428219 | | 12/1994 |
| WO | WO98/30614 | | 7/1998 |

OTHER PUBLICATIONS

"Monomer Sequence Distribution in Ethylene Propylene Elastomers. I. Measurement by Carbon–13 Nuclear Magnetic Resonance Spectroscopy", C. J. Carman et al., Rubber Chem. Technol., 44, (1971), pp. 781–804.

"Propylene homo– and copolymerization with ethylene using an ethylenebis(1–indenyl)zirconium dichloride and methylaluminoxane catalyst system", T. Tsutsui et al., Polymer, vol. 30, Jul. 1989, pp. 1350–1356.

Ray et al., Macromolecules, vol. 10, No. 4, 773–778, (1977).*

European Search Report

* cited by examiner

PROPYLENE/ETHYLENE RANDOM COPOLYMER, MOLDING MATERIAL, AND MOLDED ARTICLE

FIELD OF THE INVENTION

This invention relates to new propylene/ethylene random copolymers with very high randomness. More particularly, the invention relates to propylene/ethylene random copolymers which are suitable as materials for the production of molded articles excellent in stiffness, heat resistance, transparency, etc.

BACKGROUND ART

Olefin polymers represented by polypropylene and polyethylene have been extensively used as a base resin in the field of various moldings, because of their good mechanical properties, good chemical resistance and very useful balance with economy. These olefin copolymers have been produced by polymerizing olefins using Ziegler-Natta catalyst system comprising a transition metal catalyst component having titanium trichloride, titanium tetrachloride or the mixture thereof supported on a support such as magnesium chloride, in combination with an organoaluminum compound.

In recent years, various processes of polymerizing olefins have been proposed using a metallocene catalyst system comprising an organic transition metal compound having specified organic radical different from an inorganic transition metal compound, what is called a metallocene compound in combination with an aluminoxane. The olefin copolymers produced using the metallocene catalyst system are generally those having narrow molecular weight distribution. In particular, where two or more olefins are copolymerized, comonomers are dispersed homogenously and copolymerized, thus producing more homogenous copolymers with high randomness as compared with those using Ziegler-Natta catalyst system. Further, choice of metallocene species can produce an isotactic polypropylene having high stereoregularity.

These propylene/ethylene random copolymers are compounded with various additives to form pellets and provided for the manufacture of various molded articles such as films, injection moldings, blow moldings, sheets, fibers, etc. For these molding materials, basic properties of propylene/ethylene copolymers are specified and the additives are selected in accordance with the intended object.

EP 0629631, JPA 7-149833 and JPA 8-73532 disclose the application to films of isotactic polypropylenes produced using a metallocene catalyst system. JPA 7-149833 and JPA 8-73532 disclose that propylene/ethylene random copolymers produced by copolymerizing propylene and ethylene using a metallocene catalyst system comprising a particular chiral metallocene compound are characterized by $^{13}$C-NMR spectroscopy and that propylene/ethylene random copolymers having the following characteristics exhibit a heat-sealing property which is one of performances required for film.

|  | JPA-7-149833 | JPA-8-73532 |
| --- | --- | --- |
| Ethylene unit content (mol %) | 5–50 | 0.5–5 |
| Triadocticity of propylene unit (%) | ≧90 | ≧95 |
| 2,1- and 1,3-propylene units (%) | 0.05–0.5 | 0.05–0.5 |
| Intrinsic viscosity (dl/g) | 0.1–12 | 0.1–12 |
| Melt flow rate (g/10 min) | ≦20 | ≦20 |

However, these publications give no reference to the randomness of the ethylene unit present in the polymer chain.

As one embodiment of polypropylene films, there are biaxially oriented multi-layer films produced generally by laminating a basic layer comprising a crystalline polypropylene film and a heat-seal layer being heat sealable at lower temperature, followed by biaxial orientation. JPA 8-238729 discloses a composite film using as a heat seal layer a propylene/1-butene random copolymer produced with a metallocene catalyst system. This copolymer has 1.0 to 1.5 of parameter B value indicating the randomness in chain distribution of comonomers in the polymer chain. Parameter B value indicating the randomness is represented by the following equation.

$$B = P_{12}/(2P_1 \cdot P_2)$$

wherein $P_1$ and $P_2$ represent a first monomer content fraction and a second monomer content fraction, respectively, and $P_{12}$ represents the proportion of (first monomer)—(second monomer) chain in the whole two molecule chains.

JPA 9-110934 (Japanese Patent Appln. 7-272428) filed by the present applicant discloses propylene/ethylene random copolymers produced by copolymerizing propylene and ethylene using an olefin polymerization catalyst comprising a single mixture system of a specific chiral metallocene compound and aluminoxane, and injection moldings and films comprising these copolymers as a base resin.

JPA-5-9225, JPA-5-9226 and JPA-5-32723 disclose polypropylene resins produced with the intention of improving the mechanical properties such as stiffness and heat resistance of moldings. These polypropylene resins contain propylene polymers having the temperature (T max) of above 117.0° C. or 118.0° C., which indicates a position of the main elution peak by a temperature fractionation method, and also contain a nucleating agent as a desired component.

JPA 7-10932 also discloses a polypropylene resin composition for injection molding which comprises a propylene polymer as a base resin into which a nucleating agent is incorporated. In this propylene polymer, the weight percent of the amount of the propylene polymer dissolved in o-dichlorobenzene between 120° C. and 135° C., based on the total weight of the propylene polymer is more than the value calculated from the equation: (40–15 logMFR)×100 wherein MFR represents a melt flow rate of propylene polymer.

WO 94/28219 discloses a composition for the formation of fibers wherein a low-melting homopolypropylene produced using a metallocene catalyst system is kneaded with a radical generating agent to lower a molecular weight of propylene.

As discussed above, different characteristics are required for propylene polymers, depending on the object of molding. Producing separately propylene polymers satisfying such respective characteristics complicates process step and process control, thus increasing the cost of production.

OBJECT OF THE INVENTION

An object of the invention is to provide a propylene/ethylene random copolymer which is suitable as a base resin for molding materials applicable to a wide variety of molding fields.

Another object of the invention is to provide a molding material comprising a propylene/ethylene random copolymer as a main component, which is usable in a wide variety of molding fields.

A further object of the invention is to provide a biaxially oriented multi-layer polypropylene film with high transparency, which comprises a polypropylene film having excellent heat resistance and stiffness and very high transparency, and a heat-seal layer having excellent heat-sealing and anti-blocking properties.

DISCLOSURE OF THE INVENTION

A propylene/ethylene random copolymer of the present invention is characterized in that:

an ethylene content (Ew) is 0.1–10 wt %, a relationship between an isolated ethylene content ($E_1$) and the ethylene content (Ew) is represented by the following equation:

$$E_1 > 0.85 - 0.01 Ew$$

2,1- and 1,3-propylene units present in a polymer chain are 0–1 mol %, a weight average molecular weight (Mw) is in the range of 40,000–1,000,000, and a ratio (Mw/Mn) of the weight average molecular weight (Mw) to a number average molecular weight (Mn) is in the range of 1.5–3.8.

The propylene/ethylene random copolymer can be produced by copolymerizing propylene and ethylene in the presence of a supported metallocene catalyst comprising a transition metal compound and aluminoxane or the reaction product thereof supported on a fine particle support and an organoaluminum compound.

The above-mentioned transition metal compound is represented by the following formula

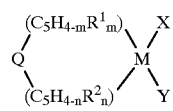

wherein M represents a transition metal selected from the group consisting of titanium, zirconium and hafnium; X and Y may be the same or different and each represents a hydrogen, a halogen or a hydrocarbyl radical; ($C_5H_{4-m}R^1_m$) and ($C_5H_{4-n}R^2_n$) represent a substituted cyclopentadienyl group in which m and n are an integer of 1–3; $R^1$ and $R^2$ may be the same or different and each represents a hydrocarbyl radical of 1 to 20 carbons or a silicone-containing hydrocarbyl radical, with the position of $R^1$ and $R^2$ on the cyclopentadienyl ring giving a configuration wherein any symmetry plane containing M each other is absent; and Q is a divalent hydrocarbyl radical, an unsubstituted silylene group and a hydrocarbyl-substituted silylene group. Preferably, at least one of $R^1$ and $R^2$ substitutes a carbon adjacent to a carbon attached to Q in the cyclopentadienyl ring.

The first embodiment of molding materials according to the present invention is a propylene composition comprising the propylene/ethylene random copolymer and a desired additive component.

The second embodiment of molding materials is a propylene/ethylene random copolymer composition comprising an α-crystal nucleating agent in an amount of 0.0001–1 part by weight based on 100 parts by weight of the copolymer and a desired additive component.

The third embodiment of molding materials is a propylene/ethylene random copolymer composition comprising the propylene/ethylene random copolymer, a radical generator in an amount of 0.001–0.5 part by weight based on 100 parts by weight of the copolymer and a desired additive component. This composition is modified by melt kneading of the above individual components at a temperature of 150 to 300° C.

The molded articles according to the present invention include films, sheets, injection moldings, extrusion moldings, blow moldings and fibers which are formed from the above first molding materials, the propylene compositions.

The films according to the present invention are those formed from the above first molding materials, the propylene compositions.

Another embodiment of the films according to the present invention is a composite film comprising a film layer formed from the above first molding materials, the propylene compositions and other polypropylene films.

A further embodiment of the films according to the present invention is a stretched, multi-layer polypropylene film having a heat-seal layer comprising a film layer formed from the above first molding materials on at least one surface of the basic layer comprising a crystalline polypropylene as a main component. This multi-layer polypropylene film is preferably biaxially oriented.

The first embodiment of the molded articles according to the present invention is injection moldings molded from the above first molding materials, the propylene compositions.

The second embodiment of the molded articles is injection moldings molded from the above second molding materials, the propylene/ethylene random copolymer compositions.

DETAILED DESCRIPTION OF THE INVENTION

Figure 1:
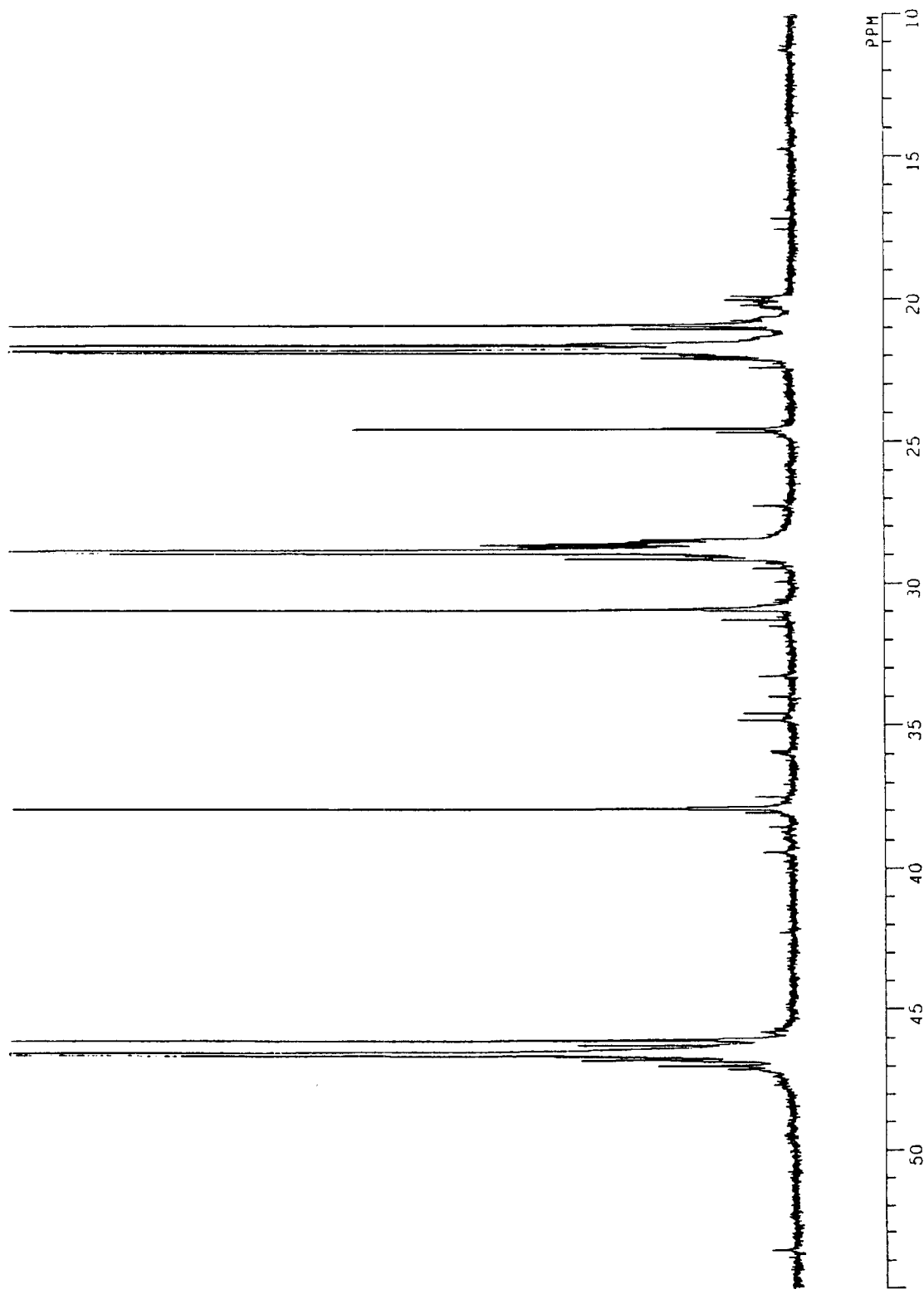
FIG. 1 is $^{13}$C NMR spectrum of the propylene/ethylene random copolymer produced in Example 1.

The propylene/ethylene random copolymer of the present invention has the following characteristics.

(i) The ethylene content (Ew) determined by $^{13}$C-NMR spectroscopy is 0.1–10 wt % (0.15–16.67 mol %).

(ii) The relationship between an isolated ethylene content ($E_1$) determined by $^{13}$C-NMR spectroscopy and the ethylene content (Ew) is represented by the following equation.

$$E_1 > 0.85 - 0.01 Ew$$

(iii) The 2,1- and 1,3-propylene units present in a polymer chain determined by $^{13}$C-NMR spectroscopy are 0–1 mol %.

(iv) The weight average molecular weight (Mw) determined by GPC is in the range of 40,000–1,000,000.

(v) The ratio (Mw/Mn) of the weight average molecular weight (Mw) to a number average molecular weight (Mn) determined by GPC is in the range of 1.5–3.8.

In addition, (vi) A melt flow rate (MFR) determined in accordance with JIS K 7210 is 1 g/10 min or more, preferably 20 g/10 min or more.

(vii) A melting point (Tm) determined by differential scanning calorimetric analyzer is in the range of 100 to 160° C.

The characteristics of the propylene/ethylene random copolymers by $^{13}$C-NMR spectroscopy can be calculated from $^{13}$C-NMR spectra which were determined for a solution of 20% by weight of the polymer in a mixed solvent of o-dichlorobenzene/benzene bromide with 8/2 weight ratio under the condition of 67.20 MHz and 130° C., using a NMR spectrometer (e.g., JEOL-GX270 manufactured by Nihon Densi K. K. in Japan).

(i) The ethylene content (Ew) can be calculated from the following equation proposed by G. Joseph Ray et al. in Macromolecules, 10, 773 (1977), the assignment of each peak in $^{13}$C-NMR spectra being calculated in accordance with the assignment method outlined by Carman et al. in Rubber Chem. Technol., 44, 781 (1971), $$Ew=[28.0521Ie/(28.052Ie+42.078Ip)]\times100(\text{wt \%})$$

wherein Ie represents a total integral value of all peaks due to the ethylene unit and Ip represents a total integral value of all peaks due to the propylene unit.

The ethylene content (EW) of the propylene/ethylene random copolymer according to the present invention is in the range of 0.1–10 wt %, preferably 0.1–5 wt %. Excessive ethylene content will result in lowering the crystallinity of the propylene/ethylene random copolymer, thus lowering the heat resistance of the molded articles comprising said copolymer as a base resin.

(ii) The isolated ethylene content ($E_1$) can be calculated from the following equation proposed by G. Joseph Ray et al. in the above reference, the assignment of each peak in $^{13}$C-NMR spectra being calculated in accordance with the assignment method by Carman et al. as mentioned above, $$E_1=0.5\times(0.5I_{\alpha\gamma}+I_{\beta\beta})/Ie$$

wherein $I_{\alpha\gamma}$ and $I_{\beta\beta}$ represent a total integral value of peaks for which each is assigned and Ie represents the same meaning as mentioned above. That is, the isolated ethylene content is the proportion of the ethylene unit present in the sequence of propylene-ethylene-propylene (PEP), based on the total ethylene units present in the polymer chain. The sequence of the ethylene unit present in three successive monomers may be EPP (ethylene-propylene-propylene), PPE (propylene-propylene-ethylene), EEP (ethylene-ethylene-propylene), EPE (ethylene-propylene-ethylene), PEE (propylene-ethylene-ethylene) and EEE (ethylene-ethylene-ethylene), in addition to the above PEP. The ethylene unit present in the sequence of PEP represents a true isolation, i.e., the randomness of the propylene/ethylene random copolymer. The higher $E_1$ value indicates the higher randomness.

The relationship between the isolated ethylene content ($E_1$) and the ethylene content (Ew) is represented by the following equation:

$$E_1>0.85-0.01Ew$$

The above equation shows that not less than 75% of the ethylene unit present in the polymer chain of the propylene/ethylene random copolymer according to the present invention is present as the isolated ethylene, i.e., in the sequence of PEP, even if the ethylene content (Ew) is 10 wt %.

The isolated ethylene content ($E_1$) of the propylene/ethylene random copolymer, i.e., randomness has an effect on the mechanical properties of the molded articles comprising said copolymer as a base resin, and particularly has a great effect on the transparency. Higher randomness gives molded articles having excellent transparency.

(iii) In the propylene/ethylene random copolymer, the 2,1- and 1,3-propylene units in the polymer chain can be calculated from $^{13}$C NMR spectra based on the method proposed by T. Tsutsui et al. in POLYMER, Vol. 30, 1350 (1989).

It is known by POLYMER, Vol. 30, 1350 (1989) that in the copolymerization of propylene and ethylene using a Ziegler-Natta catalyst system, the polymerization reaction proceeds in such a manner that most of the propylene unit in the polymer chain is in the form of 1,2-insertion, whereas in the copolymerization of propylene and ethylene using a metallocene catalyst system, a 1,2-insertion reaction may be predominant for the propylene unit, simultaneously with the 2,1- and 1,3-insertion reactions, with the result that irregular 2,1- and 1,3-propylene units in the polymer chain lower the melting point of the propylene/ethylene random copolymer.

In the propylene/ethylene random copolymer of the present invention, the 2,1- and 1,3-propylene units in the polymer chain are in the range of 0 to 1 mol %, preferably 0.1 to 0.7 mol %, and more preferably 0.2 to 0.5 mol %.

The 2,1- and 1,3-propylene units in the polymer chain influence the melting point of the propylene/ethylene random copolymer and have an effect on the heat resistance of the molded article comprising said copolymer as a base resin.

(iv) (v) The weight average molecular weight (Mw), the number average molecular weight (Mn) and the ratio thereof (Mw/Mn) can be determined at 135° C. by a gel permeation chromatography (GPC: e.g., GPC-150C manufactured by Waters Co., Ltd.) with a mixed polystyrene gel column (e.g., PSgel GMH6-HT manufactured by Toso K. K.) using a solution of 0.05% by weight of the polymer in o-dichlorobenzene.

The weight average molecular weight (Mw) of the propylene/ethylene random copolymer according to the present invention is in the range of 40,000 to 1,000,000, preferably 100,000 to 1,000,000.

The ratio (Mw/Mn) of the weight average molecular weight (Mw) to the number average molecular weight (Mn) represents a molecular weight distribution width, i.e., the dispersity of the propylene/ethylene random copolymer.

The dispersity (Mw/Mn) of the propylene/ethylene random copolymer according to the present invention is in the range of 1.5 to 3.5, preferably 1.5 to 2.5.

(vi) The melt flow rate (MFR) of the propylene/ethylene random copolymer is determined as an indication of flowability of the resin, i.e., processability.

For the propylene/ethylene random copolymer having the above-mentioned various characteristics according to the present invention, the melt flow rate (MFR) determined at a temperature of 230° C. and a load of 21.18N according to the condition 14 in Table 1 of JIS K7210 is 1 g/10 min or higher, preferably 20 g/10 min or higher, most preferably 30–50 g/10 min.

(vii) For the propylene/ethylene random copolymer of the present invention, the melting point (Tm) determined using a differential scanning calorimeter (DSC: e.g., DCS 7 type manufactured by Perkin Elmer Co., Ltd.) is in the range of 100 to 160° C., preferably 100 to 150° C., more preferably 100 to 140° C.

The melting point (Tm) of the polymer by the above DSC is a value determined as a temperature showing a peak on melting which was determined by heating the polymer from room temperature to 230° C. at a rate of 30° C./min, keeping it at 230° C. for 10 minutes, followed by lowering to −20° C. at a rate of 20° C./min, keeping it at −20° C. for further 10 minutes and heating it again at a rate of 20° C./min.

The propylene/ethylene random copolymer having the above-mentioned various characteristics according to the present invention can be produced by copolymerizing propylene and ethylene in the presence of a supported metallocene catalyst comprising a transition metal compound and an aluminoxane or the reaction product thereof supported on a fine particle support and an organoaluminum compound.

The transition metal compound is represented by the following formula

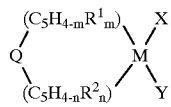

wherein M represents a transition metal atom selected from the group consisting of titanium, zirconium and hafnium; X and Y may be the same or different and each represents a hydrogen atom, a halogen atom or a hydrocarbyl radical; $(C_5H_{4-m}R^1_m)$ and $(C_5H_{4-n}R^2_n)$ represent a substituted cyclopentadienyl group in which m and n are an integer of 1–3; $R^1$ and $R^2$ may be the same or different and each represents a hydrocarbyl radical of 1 to 20 carbons or a silicone-containing hydrocarbyl radical, with the proviso that the position of $R^1$ and $R^2$ on the cyclopentadienyl ring gives a configuration wherein any symmetry plane containing M each other is absent; and Q is a divalent hydrocarbyl radical, an unsubstituted silylene group and a hydrocarbyl-substituted silylene group.

More specifically, the halogen atoms represented by X and Y in the formula include fluorine, chlorine, bromine and iodine, the hydrocarbyl radicals include an alkyl group such as methyl, ethyl, propyl, isopropyl, butyl, isobutyl, sesquibutyl, tertiary butyl, pentyl, heptyl, hexyl, octyl, 2-ethylhexyl, nonyl, decyl, dodecyl, octadecyl, etc.; a halogenated alkyl group wherein a part or all of the hydrogen atoms in the alkyl group are substituted by said halogen atom; an unsubstituted or substituted cycloalkyl group which may be substituted by said halogen atom, said alkyl or halogenated alkyl group, such as cyclopentyl, cyclohexyl, etc.; an unsubstituted or substituted aryl group which may be substituted by said halogen atom, said alkyl or halogenated alkyl group, such as phenyl, naphthyl, benzyl, etc.; an alkoxy group such as methoxy, ethoxy, isopropoxy, butoxy, etc.; a halogenated alkoxy group; and an unsubsituted or substituted aryloxy group such as phenoxy, benzyloxy, etc.

The hydrocarbyl radicals of 1 to 20 carbons represented by $R^1$ and $R^2$ in the above formula are the same groups as recited above, and the silicone-containing hydrocarbyl radicals include a trialkylsilyl group such as trimethylsilyl, triethylsilyl, dimethylethylsilyl, methyldiethylsilyl, etc.; a silylalkyl group such as trimethylsilylmethyl, triethylsilylethyl, etc.; and a silyloxy group such as trimethylsilyloxy, triethylsilyloxy, etc.

The position of the substituents $R^1$ and $R^2$ on two cyclopentadienyl rings gives a configuration wherein any symmetry plane containing M each other is absent. It is preferable that at least one of $R^1$ and $R^2$ is attached to the carbon adjacent to the carbon attached to Q on the cyclopentadienyl ring.

The divalent hydrocarbyl groups represented by Q in the above formula include an alkylene group such as methylene, ethylene, 1,3-propylene, 1,2-propylene, 2,2-propylene, etc.; an arylene group such as phenylene, naphthylene, etc. The hydrocarbon-substituted silylene groups include those substituted by the above hydrocarbyl radical, such as dimethylsilylene, diethylsilylene, methylethylsilylene, methylphenylsilylene, etc.

As a transition metal compound, any compound of the above formula can be used, for example, dimethylsilylene(2,4-dimethylcyclopentadienyl)(3',5'-dimethylcyclopentadienyl)titanium dichloride, dimethylsilylene(2,4-dimethylcyclopentadienyl)(3',5'-dimethylcyclopentadienyl)zirconium dichloride, dimethylsilylene(2,4-dimethylcyclopentadienyl)(3',5'-dimethylcyclopentadienyl)hafnium dichloride, dimethylsilylene(2,4-dimethylcyclopentadienyl)(3',5'-dimethylcyclopentadienyl)titanium dimethyl, dimethylsilylene(2,4-dimethylcyclopentadienyl)(3',5'-dimethylcyclopentadienyl)zirconium dimethyl, dimethylsilylene(2,4-dimethylcyclopentadienyl)(3',5'-dimethylcyclopentadienyl)hafnium dimethyl, dimethylsilylene(2-methyl-4-t-butylcyclopentadienyl)(3'-methyl-5'-t-butylcyclopentadienyl)zirconium dichloride, dimethylsilylene(2-methyl-4-trimethylsilylcyclopentadienyl)-(3'-methyl-5'-trimethylsilylcyclopentadienyl)zirconium dichloride, dimethylsilylene(2,3,5-trimethylcyclopentadienyl)(2',4',5'-trimethylcyclopentadienyl)titanium dichloride, dimethylsilylene(2,3,5-trimethylcyclopentadienyl)(2', 4',5'-trimethylcyclopentadienyl)zirconium dichloride, dimethylsilylene(2,3,5-trimethylcyclopentadienyl)(2',4',5'-trimethylcyclopentadienyl)zirconium dimethyl, dimethylsilylene(2,3,5-trimethylcyclopentadienyl)(2',4',5'-trimethylcyclopentadienyl)hafnium dichloride, dimethylsilylene(2,3,5-trimethylcyclopentadienyl)(2',4',5'-trimethylcyclopentadienyl)hafnium dimethyl, etc. In particular, dimethylsilylene(2,3,5-trimethylcyclopentadienyl)(2',4',5'-trimethylcyclopentadienyl)zirconium dichloride is preferably used.

The aluminoxane is an organic radical-containing aluminum compound represented by formula (1) or (2).

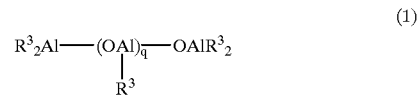

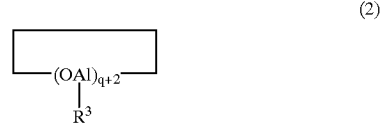

wherein $R^3$s are a hydrocarbyl radical of 1 to 6 carbons, preferably 1 to 4 carbons, e.g., an alkyl group such as methyl, ethyl, propyl, butyl, isobutyl, pentyl, hexyl, etc.; an alkenyl group such as allyl, 2-methylallyl, propenyl, isopropenyl, 2-methyl-1-propenyl, butenyl, etc.; a cycloalkyl group such as cyclopropyl, cyclobutyl, cyclopentyl, cyclohexyl, etc.; and an aryl group, etc.; and each $R^3$ may be the same or different. Preferable $R^3$ is an alkyl group. q is an integer of 4 to 30, preferably 6 to 30, and more preferably 8 to 30.

The above-mentioned aluminoxanes may use commercially available products, and also they may be prepared by known methods. The aluminoxanes can be prepared, for example, by the following methods:

A method of reacting a trialkyl aluminum, e.g., trimethyl aluminum, triisobutyl aluminum or the mixture thereof, directly with water in an organic solvent such as toluene, ether, etc.;

A method of reacting a trialkyl aluminum, e.g., trimethyl aluminum, triisobutyl aluminum or the mixture thereof, with salts containing crystal water, e.g., copper sulfate hydrate and aluminum sulfate hydrate; and A method of reacting water impregnated in silica gel or the like, with a trialkyl aluminum, e.g., trimethyl aluminum, triisobutyl aluminum, separately or simultaneously or successively.

The fine particle supports, on which the transition metal compound and aluminoxane or the reaction product thereof are supported, are granulated or spherical, inorganic or organic solid fine particles having a particle diameter of 1 to 500 μm, preferably 5 to 300 μm.

The inorganic fine particle supports used are fine particles of metal oxides, e.g., $SiO_2$, $Al_2O_3$, MgO, $ZrO_2$, $TiO_2$, etc., and the mixture thereof or the composite oxides thereof. Preferable are fine particles comprising as a main component at least one selected from the group consisting of $SiO_2$, $Al_2O_3$ and MgO. For instance, $SiO_2$, $Al_2O_3$, MgO, $SiO_2$—$Al_2O_3$, $SiO_2$—MgO, $SiO_2$—$TiO_2$, $SiO_2$—$Al_2O_3$—MgO, etc. are preferably used. These inorganic fine particle supports are used after fired usually at a temperature of 100 to 1000° C. for 1 to 40 hours. Instead of firing, they may be used after chemically dehydrated, e.g., with $SiCl_4$, chlorosilane, etc.

The organic fine particle supports which can be used include polymer fine particles such as polyolefin polymer fine particles, e.g., polyethylene, polypropylene, poly(1-butene), poly(4-methyl-1-pentene), polystyrene fine particles, etc.

The supported metallocene catalyst is prepared by reacting the transition metal compound with aluminoxane in the presence of the fine particle support. In general, the desired, supported metallocene catalysts can be prepared by contacting a transition metal compound and aluminoxane soluble in a hydrocarbon solvent with a dehydrated fine particle support to deposit the transition metal compound and aluminoxane or the reaction product thereof on the fine particle support. The order for contacting the transition metal compound and aluminoxane with the fine particle support can be varied arbitrarily, with no particular limitation. The desired, supported metallocene catalyst can be prepared, for instance, by any of the methods which include a method of initially adding a solution of a transition metal compound dissolved in a suitable hydrocarbon solvent to a fine particle support and subsequently adding aluminoxane; a method of adding a reaction product of a transition metal compound and aluminoxane to a fine particle support; and a method of initially adding aluminoxane to a fine particle support, followed by adding a transition metal compound.

The ratio of the transition metal compound to aluminoxane supported on the fine particle support is 12 to 1000 mol, preferably 50 to 500 mol in terms of Al atom derived from aluminoxane, per mole of a transition metal atom derived from the transition metal compound.

The reaction conditions include the reaction temperature of usually −20 to 100° C., preferably 0 to 100° C. and the reaction time of usually 0.1 minute or more, and preferably 1 to 200 minutes.

The supported metallocene catalyst is preferably used for the copolymerization of propylene and ethylene, after it has been pre-activated by prepolymerizing small amounts of olefins on the supported metallocene catalyst. The olefins used for the pre-activation include ethylene, propylene, 1-butene, 1-hexene, 3-methyl-1-butene, 4-methyl-1-pentene, etc. and the mixture thereof.

The polymerization amount of olefins for the pre-activation of the supported metallocene catalyst is usually 10 to 1000 wt %, preferably 30 to 300 wt %, more preferably 30 to 100 wt %, based on the supported metallocene catalyst.

An olefin polymerization catalyst comprises the supported metallocene catalyst, preferably the preactivated, supported metallocene catalyst, and the organoaluminum compound. The organoaluminum compound acts as a scavenger. Such organoaluminum compounds include, e.g., triethylaluminum, tri-isopropylaluminum, tri-isobutylaluminum, tri-n-butylaluminum, tri-n-hexylaluminum, di-isobutylaluminum hydride and the mixtures thereof. In particular, triethylaluminum and tri-isobutylaluminum are preferably used.

The propylene/ethylene random copolymer of the present invention can be produced by copolymerizing propylene and ethylene in the presence of the olefin polymerization catalyst comprising the supported metallocene catalyst, preferably the preactivated, supported metallocene catalyst, and the organoaluminum compound.

As a process for the copolymerization of propylene and ethylene, known polymerization processes of propylene can be employed, for example, a slurry polymerization process wherein propylene is polymerized in an inert solvent including an aliphatic hydrocarbon such as butane, pentane, hexane, heptane and isooctane, an alicyclic hydrocarbon such as cyclopentane, cyclohexane and methylcyclohexane, an aromatic hydrocarbon such as toluene, xylene and ethylbenzene, and gasoline fraction and hydrogenated diesel oil; a bulk polymerization process wherein propylene itself is used as a solvent; a gas phase polymerization process wherein propylene is polymerized in a gas phase; a solution polymerization process wherein a liquid polypropylene is formed; and a combination of these two or more polymerization processes.

As the conditions for the copolymerization of propylene and ethylene in the above polymerization process, similar conditions to those in the olefin polymerization using a Ziegler-Natta catalyst system are usually employed. More specifically, the polymerization temperature ranges from −50 to 150° C., preferably −10 to 100° C., more preferably 40 to 80° C. The polymerization pressure ranges from atmospheric pressure to 7 MPa, preferably 0.2 to 5 MPa. The polymerization time is usually about one minute to 20 hrs. The molecular weight of the resulting propylene/ethylene random copolymer can be controlled by choice of the polymerization conditions as mentioned above, but it may be controlled, if desired, by introducing a molecular weight modifier, e.g., hydrogen into the polymerization system.

In the copolymerization of propylene and ethylene, other monomers than ethylene and propylene may be copolymerized to a degree not impairing the effect of the propylene/ethylene random copolymer according to the present invention. A copolymerizable monomer includes, but not limited to, olefins of 4–20 carbons, e.g., 1-butene, 1-pentene, 1-hexene, 1-octene, 1-decene, 4-methyl-1-pentene, 3-methyl-1-pentene, etc. and the mixture thereof. In particular, 1-butene is preferably used. In addition to these olefins, small amounts of α,(ω-dienes such as 1,5-hexadiene, 1,9-decadiene may be copolymerized.

After the completion of the copolymerization reaction of propylene and ethylene, the propylene/ethylene random copolymer with the above-mentioned various characteristics is produced through known after-treatment steps of deactivating the catalyst, removing the catalyst residue, drying, and the like.

The first embodiment of the molding material in the present invention is the propylene composition (called hereafter "first molding material") comprising the propylene/ethylene random copolymer with the above-mentioned various characteristics and a desired additive component.

The additive components include various additives generally incorporated in the polypropylene resin composition, and synthetic resins or the like. These additives include, for example, antioxidants such as phenol-, thioether- or phosphorus-antioxidants; ultraviolet absorbing agents; heat stabilizers; heavy metal inactivators (copper pollution inhibitors); clarifiers; antistatic agents; nucleating agents; lubricants; anti-fogging agents; flame retardants; auxiliaries for flame retardants; antiblocking agents; anti-dropping agents; radical generators; pigments; colorants; halogen scavengers; dispersing agents or neutralizing agents such as metal soaps; organic or inorganic antibacterial agents; inorganic fillers, e.g., talc, mica, clay, wollastonite, zeolite, kaolin, bentonite, pearlite, diatomaceous earth, asbestos, calcium carbonate, magnesium carbonate, aluminum hydroxide, magnesium hydroxide, hydrotalcite, basic aluminum lithium hydroxycarbonate hydrate, silicon dioxide, titanium dioxide, zinc oxide, magnesium oxide, calcium oxide, zinc sulfide, barium sulfate, magnesium sulfate, calcium silicate, aluminum silicate, glass fibers, potassium titanate, carbon fibers, carbon black, graphite and metallic fibers; organic fillers, e.g., wood flour, pulp, wastepaper, synthetic fibers and natural fibers; coupling agents, e.g., silane-, titanate-, boron-, aluminate- or zircoaluminate-coupling agents; and the inorganic or organic fillers which are surface-treated with any of the coupling agents. The synthetic resins which can be added include, for example, polyethylene such as HDPE, LDPE, LLDPE and VLLDPE or ethylene copolymers; polyolefins such as polypropylene, poly(1-butene), poly(1-pentene), poly(1-hexene), poly(1-octene), poly(1-decene), poly(4-methyl-1-pentene) and poly(3-metyl-1-pentene); olefin random or block copolymers such as ethylene/propylene, ethylene/1-butene, propylene/1-butene and ethylene/propylene/1-butene; rubber components such as polybutadiene, polyisoprene, natural rubbers and the hydrogenated products thereof; olefin elastomers, a typical example of which is EPR, EBR, EHR, EOR, EPDM, CEBC and PBR; styrene elastomers, a typical example of which is HSBR, SEP, SEB, SEPS, SEBS and SEBC; nylon; polycarbonate; ABS; polystyrene; and maleic anhydride modified propylene polymers.

These additive components are selected suitably depending on the purpose of molding.

As mentioned above, the first molding material is a propylene composition comprising the propylene/ethylene random copolymer as a base resin, into which a prescribed amount of the additive components is incorporated as required depending on the purpose of molding.

In general, the first molding materials are provided for the formation of films, sheets, injection moldings, extrusion moldings, blow moldings, fibers, etc. in the form of pellets prepared by compounding the base resin with a prescribed amount of the desired additive component, subjecting the compound to melt-kneading, followed by cutting into granulates.

The melt-kneading temperature is usually 170 to 300° C., preferably 180 to 270° C.

Conventional mixing apparatus such as Henschel mixer (trade name), Super mixer, ribbon blender and Banbury mixer, a single screw extruder, a double-screw extruder, Brabender, roll, etc. are used for melt-kneading and pelletizing.

The second embodiment of the molding material in the present invention is the propylene/ethylene random copolymer composition (called hereafter "second molding material") comprising the propylene/ethylene random copolymer, an α-crystal nucleating agent of 0.0001 to 1 part by weight based on 100 parts by weight of the copolymer, and a desired additive component. That is, the second molding material is the composition wherein a prescribed amount of α-crystal nucleating agent is incorporated into the first molding material.

The α-crystal nucleating agent accelerates the crystallization of the-propylene/ethylene random copolymer as a base resin, and improves the stiffness, heat resistance, and further, transparency of the molded articles.

If the amount of α-crystal nucleating agent incorporated is too little, the crystallization of the propylene/ethylene random copolymer becomes insufficient, resulting in unsatisfactory improvement of the stiffness and heat resistance of the molded articles. If the amount is too much, the transparency of the molded article is lowered.

The amount of α-crystal nucleating agent incorporated is preferably 0.01 to 0.5 part by weight, more preferably 0.05 to 0.3 part by weight.

The α-crystal nucleating agents to be used include inorganic compounds; carboxylic acids except for aliphatic monocarboxylic acids; normal or basic salts thereof; dibenzylidenesorbitol compounds; arylphosphate compounds; mixtures of cyclic polyvalent metal aryl phosphate compounds and alkali metal salts of aliphatic monocarboxylic acids or basic aluminum lithium hydrocarbonate hydrate; polymeric compounds; and the mixtures thereof.

The inorganic compounds include, e.g., talc, alum, silica, titanium oxide, calcium oxide, magnesium oxide, carbon black, clay minerals or the like.

The carboxylic acids except for aliphatic monocarboxylic acids include, e.g., malonic acid, succinic acid, adipic acid, maleic acid, azelaic acid, sebacic acid, dodecanic diacid, citric acid, butanetricarboxylic acid, butanetetracarboxylic acid, naphthenic acid, cyclopentanecarboxylic acid, 1-methylcyclopentanecarboxylic acid, 2-methylcyclopentanecarboxylic acid, cyclopentenecarboxylic acid, cyclohexanecarboxylic acid, 1-methylcyclohexanecarboxylic acid, 4-methylcyclohexanecarboxylic acid, 3,5-dimethylcyclohexanecarboxylic acid, 4-butylcyclohexanecarboxylic acid, 4-octylcyclohexanecarboxylic acid, cyclohexenecarboxylic acid, 4-cyclohexene-1,2-dicarboxylic acid, benzoic acid, toluic acid, xylic acid, ethylbenzoic acid, 4-t-butylbenzoic acid, salicylic acid, phthalic acid, trimellitic acid, pyromellitic acid or the like. Their normal or basic salts include salts of lithium, sodium, potassium, magnesium, strontium, barium, zinc or aluminum.

Dibenzylidenesorbitol compounds include, e.g., 1.3,2.4-dibenzylidenesorbitol, 1.3-benzylidene-2.4-p-methylbenzylidenesorbitol, 1.3-benzylidene-2.4-p-ethylbenzylidenesorbitol, 1.3-p-methylbenzylidene-2.4-benzylidenesorbitol, 1.3-p-ethylbenzylidene-2.4-benzylidenesorbitol, 1.3-p-methylbenzylidene-2.4-p-ethylbenzylidenesorbitol, 1.3-p-ethylbenzylidene-2.4-p-methylbenzylidenesorbitol, 1.3,2.4-bis(p-methylbenzylidene)sorbitol, 1.3,2.4-bis(p-ethylbenzylidene)sorbitol, 1.3,2.4-bis(p-n-propylbenzylidene)sorbitol, 1.3,2.4-bis(p-i-propylbenzylidene)sorbitol, 1.3,2.4-bis(p-n-butylbenzylidene)sorbitol, 1.3,2.4-bis(p-s-butylbenzylidene)sorbitol, 1.3,2.4-bis(p-t-butylbenzylidene)sorbitol, 1.3-(2'.4'-dimethylbenzylidene)-2.4-benzylidenesorbitol, 1.3-benzylidene-2.4-(2'.4'-dimethylbenzylidene)sorbitol, 1.3,2.4-bis(2',4'-dimethylbenzylidene)sorbitol, 1.3,2.4-bis(3',4'- dimethylbenzylidene)sorbitol, 1.3,2.4-bis(p-methoxybenzylidene)sorbitol, 1.3,2.4-bis(p-ethoxybenzylidene)sorbitol, 1.3-benzylidene-2.4-p-chlorobenzylidenesorbitol, 1.3-p-chlorobenzylidene-2.4-benzylidenesorbitol, 1.3-p-chlorobenzylidene-2.4-p-methylbenzylidenesorbitol, 1.3-p-chlorobenzylidene-2.4-p-ethylbenzylidenesorbitol, 1.3-p-methylbenzylidene-2.4-p-chlorobenzylidenesorbitol, 1.3-p-ethylbenzylidene-2.4-p-chlorobenzylidenesorbitol, 1.3,2.4-bis(p-chlorobenzylidene)-sorbitol or the like.

The arylphosphate compounds include, e.g., lithium bis(4-t-butylphenyl)phosphate, sodium bis(4-t-butylphenyl)phosphate, lithium bis(4-cumylphenyl)phosphate, sodium bis(4-cumylphenyl)phosphate, potassium bis(4-t-butylphenyl)phosphate, calcium mono(4-t-butylphenyl)phosphate, calcium bis(4-t-butylphenyl)phosphate, magnesium mono(4-t-butylphenyl)phosphate, magnesium bis(4-t-butylphenyl)phosphate, zinc mono(4-t-butylphenyl)phosphate, aluminum dihydroxy-(4-t-butylphenyl)phosphate, aluminum hydroxy-bis(4-t-butyl-phenyl)phosphate, aluminum tris(4-t-butylphenyl)phosphate, sodium 2,2'-methylene-bis(4,6-di-t-butylphenyl)phosphate, sodium 2,2'-ethylidene-bis(4,6-di-t-butylphenyl)phosphate, sodium 2,2'-methylene-bis(4-cumyl-6-t-butylphenyl)phosphate, lithium 2,2'-methylene-bis(4,6-di-t-butylphenyl)phosphate, lithium 2,2'-ethylidene-bis(4,6-di-t-buthylphenyl)phosphate, lithium 2,2'-methylene-bis(4-cumyl-6-di-t-butylphenyl)phosphate, sodium 2,2'-ethylidene-bis(4-i-propyl-6-di-t-butylphenyl)phosphate, lithium 2,2'-methylene-bis(4-methyl-6-di-t-butylphenyl)phosphate, lithium 2,2'-methylene-bis(4-ethyl-6-di-t-butylphenyl)phosphate, sodium 2,2'-butylidene-bis(4,6-dimethylphenyl)phosphate, sodium 2,2'-butylidene-bis(4,6-di-t-butylphenyl)phosphate, sodium 2,2'-t-octylmethylene-bis(4,6-di-methylphenyl)-phosphate, sodium 2,2'-octylmethylene-bis(4,6-di-t-butylphenyl)phosphate, sodium 2,2'-methylene-bis(4-methyl-6-di-t-butylphenyl)phosphate, sodium 2,2'-methylene-bis(4-ethyl-6-di-t-butylphenyl)phosphate, sodium (4,4'-dimethyl-6,6'-di-t-butyl-2,2'-biphenyl)phosphate, sodium 2,2'-ethylidene-bis(4-s-butyl-6-t-butylphenyl)phosphate, sodium 2,2'-methylene-bis(4,6-di-methylphenyl)phosphate, sodium 2,2'-methylene-bis(4,6-di-ethylphenyl)phosphate, potassium 2,2'-ethylidene-bis(4,6-di-t-butylphenyl)phosphate, etc.

The cyclic polyvalent metal aryl phosphate compounds include calcium bis[2,2'-methylene-bis(4,6-di-t-butylphenyl)phosphate], magnesium bis[2,2'-methylene-bis(4,6-di-t-butylphenyl)phosphate], zinc-bis[2,2'-methylene-bis(4,6-di-t-butylphenyl)phosphate], aluminum tris[2,2'-methylene-bis(4,6-di-t-butylphenyl)phosphate], calcium-bis[2,2'-methylene-bis(4-methyl-6-t-butylphenyl)-phosphate], calcium bis[2,2'-thiobis(4-methyl-6-t-butylphenyl)phosphate], calcium-bis[2,2'-thiobis(4-ethyl-6-t-butylphenyl)phosphate], calcium bis[2,2'-thiobis(4,6-di-t-butylphenyl)phosphate], magnesium bis[2,2'-thiobis(4,6-di-t-butylphenyl)phosphate], magnesium bis[2,2'-thiobis(4-t-octylphenyl)phosphate], barium bis[2,2'-methylene-bis(4,6-di-t-butylphenyl)phosphate], calcium bis[(4,4'-dimethyl-6,6'-di-t-butyl-2,2'-biphenyl)phosphate], magnesium bis[2,2'-ethylidene-bis(4,6-di-t-butylphenyl)phosphate], barium bis[2,2'-ethylidene-bis(4,6-di-t-butylphenyl)phosphate], aluminum tris[2,2'-ethylidene-bis(4,6-di-t-butylphenyl)phosphate], aluminum dihydroxy-2,2'-methylene-bis(4,6-di-t-butylphenyl)phosphate, aluminum dihydroxy-2,2'-methylene-bis(4-cumyl-6-t-butylphenyl)phosphate, aluminum hydroxy-bis[2,2'-methylene-bis(4,6-di-t-butylphenyl)phosphate], aluminum hydroxy-bis[2,2'-methylene-bis(4-cumyl-6-t-butylphenyl)phosphate], titanium dihydroxy-bis[2,2'-methylene-bis(4,6-di-t-butylphenyl)phosphate], tin dihydroxy-bis[2,2'-methylene-bis(4,6-di-t-butylphenyl)phosphate], zirconium oxy-bis[2,2'-methylene-bis(4,6-di-t-butylphenyl)phosphate, aluminum dihydroxy-2,2'-methylene-bis(4-methyl-6-t-butylphenyl)phosphate, aluminum hydroxy-bis[2,2'-methylene-bis(4-methyl-6-t-butylphenyl)phosphate], aluminum dihydroxy-2,2'-ethylidene-bis(4,6-di-t-butylphenyl)phosphate, aluminum hydroxy-bis[2,2'-ethylidene-bis(4,6-di-t-butylphenyl)phosphate] and the like.

The alkali metal salts of aliphatic monocarboxylic acids which are used in admixture with the cyclic polyvalent metal aryl phosphate compounds include lithium, sodium or potassium salts of aliphatic monocarboxylic acids such as acetic acid, lactic acid, propionic acid, acrylic acid, octanoic acid, isooctanoic acid, nonanoic acid, decanoic acid, lauric acid, myristic acid, palmitic acid, stearic acid, oleic acid, linoleic acid, linolenic acid, 12-hydroxystearic acid, ricinolic acid, behenic acid, erucic acid, montanoic acid, melissic acid, stearoyllactic acid, β-dodecylmercaptoacetic acid, β-dodecylmercaptopropionic acid, β-N-laurylaminopropionic acid, β-N-methyl-lauroylamino-propionic acid and the like. The mixture of the cyclic polyvalent metal aryl phosphate compounds and basic aluminum lithium hydrocarbonate hydrate is also included.

The polymeric compounds include, e.g., poly(3-methyl-1-butene), poly(3-methyl-1-pentene), poly(4-methyl-1-pentene), poly(4-methyl-1-hexene), poly(4,4-dimethyl-1-pentene), poly(4,4-dimethyl-1-hexene), poly(4-ethyl-1-hexene), poly(3-ethyl-1-hexene), polyallylnaphthalene, polyallylnorbornane, atactic polystyrene, syndiotactic polystyrene, polydimethylstyrene, polyvinylnaphthalene, polyallylbenzene, polyallyltoluene, polyvinylcyclopentane, polyvinylcyclohexane, polyvinylcycloheptane, polyvinyltrimethylsilane, polyallyltrimethylsilane and the like.

Particularly preferable α-crystal nucleating agents include talc, aluminum hydroxy-bis(4-t-butylbenzoate), 1,3,2.4-dibenzylidenesorbitol, 1.3,2.4-bis(p-methylbenzylidene)sorbitol, 1.3,2.4-bis(p-ethyl-benzylidene)sorbitol, 1.3,2.4-bis(2',4'-dimethyl-benzylidene)-sorbitol, 1.3,2.4-bis(3',4'-dimethyl-benzylidene)sorbitol, 1.3-p-chlorobenzylidene-2.4-p-methylbenzylidene)sorbitol, 1.3,2.4-bis(p-chlorobenzylidene)sorbitol; sodium bis(4-t-butylphenyl)phosphate, sodium 2,2'-methylene-bis(4,6-di-t-butylphenyl)phosphate, cyclic polyvalent metal arylphosphate compounds, e.g., calcium 2,2'-methylene-bis(4,6-di-t-butylphenyl)phosphate, aluminum 2,2'-methylene-bis(4,6-di-t-butylphenyl)phosphate, aluminum dihydroxy-2,2'-methylene-bis(4,6-di-t-butylphenyl)phosphate or mixtures of aluminum hydroxy-bis[2,2'-methylene-bis(4,6-di-t-butylphenyl)phosphate] and alkali metal salts of the aliphatic monocarboxylic acids, poly(3-methyl-1-butene), polyvinylcyclohexane, triallyltrimethylsilane; and the mixture thereof.

The second molding materials can be suitably used in the manufacture of molded articles according to various molding methods such as injection, extrusion and blow molding methods.

The third embodiment of the molding materials in the present invention is a polypropylene/ethylene random copolymer composition (called hereafter "third molding material") comprising the polypropylene/ethylene random copolymer, a radical generator of 0.001 to 0.5 part by weight based on 100 parts by weight of the copolymer, and a desired additive component. That is, the third material is a composition wherein a prescribed amount of the radical generator is incorporated into the first molding material.

The third molding material is melt-kneaded at 150–300° C. for modification, thereby giving a polypropylene/ethylene random copolymer composition having a controlled melt flow rate (MFR).

The radical generator added to the polypropylene/ethylene random copolymer can control the melt flow rate (MFR) of the composition to a desired value, while maintaining the melting point (Tm) and dispersity (Mw/Mn) of the propylene/ethylene random copolymer which is a base resin by melt-kneading. As a result, the processability of the composition is improved.

If the amount of the radical generator incorporated is too little, the effect of controlling MFR becomes insufficient. If it is too much, the composition cannot maintain its characteristics as mentioned above.

The amount of the radical generator incorporated is usually 0.001 to 0.5 part by weight, preferably 0.01 to 0.2 part by weight, based on 100 parts by weight of the base resin.

It is required to melt-knead the base resin and the radical generator at a suitable temperature so that the radical generator can achieve the above-mentioned function. If the melt-kneading temperature is too low, the effect of modifying the composition becomes insufficient. If it is too high, a coloration of the composition becomes remarkable.

The melt-kneading temperature is usually 150 to 270° C., preferably 180 to 270° C.

For the radical generator which acts as mentioned above, it is desirable that the decomposition temperature is not too low to obtain a uniform mixed composition. The temperature for obtaining a half-life period of 10 hours is 70° C. or higher, preferably 100° C. or higher.

Such radical generators include organic peroxides such as, e.g., benzoyl peroxide, t-butyl peroxide, t-butylperacetate, t-butylperoxyisopropylcarbonate, 2,5-dimethyl-2,5-di(benzoylperoxy)hexane, 2,5-dimethyl-2,5-di(benzoylperoxy)hexyne-3, t-butyl-di-peradipate, t-butylperoxy-3,5,5-trimethylhexanoate, methyl ethyl ketone peroxide, cyclohexanone peroxide, di-t-butyl peroxide, dicumyl peroxide, 2,5-dimethyl-2,5-di(t-butylperoxy)hexane, 2,5-dimethyl-2,5-di(t-butylperoxy)hexyne-3, 1,3-bis(t-butylperoxyisopropyl)benzene, t-butylcumyl peroxide, 1,1-bis(t-butylperoxy)-3,5,5-trimethylcyclohexane, 2,2-bis(t-butylperoxy)butane, p-methane hydroperoxide, di-isopropylbenzene hydroperoxide, cumene hydroperoxide, t-butyl hydroperoxide, p-cymene hydroperoxide, 1,1,3,3-tetramethyl-butyl hydroperoxide, 2,5-dimethyl-2,5-di(hydroperoxy)hexane, trimethylsilyl-cumylperoxide, 2,5-dimetyl-2,5-bis(trimethylsilylperoxy)hexane, 2,5-dimetyl-2,5-bis(trimethylsilylperoxy)hexyne-3, 1,3-bis(trimethylsilylperoxyisopropyl)benzene, and the mixtures thereof.

Particularly preferable radical generators are 2,5-dimethyl-2,5-di(t-butylperoxy)hexane, 2,5-dimethyl-2,5-di(t-butylperoxy)hexyne-3 and 1,3-bis(t-butylperoxyisopropyl)benzene and the mixture thereof.

In the third molding material, MFR of the composition is controlled to a desired value by melt-kneading radical generators, while maintaining the melting point (Tm) and dispersity (Mw/Mn) of the propylene/ethylene random copolymer as a base resin. Thus, the processability can be controlled arbitrarily. The molded articles formed therefrom maintain various mechanical properties peculiar to the propylene/ethylene random copolymer, e.g., strength, elastic modulus, Young's modulus, elongation, etc.

When the third molding materials having controlled MFR are used in the manufacture of fibers, a spinning speed is efficiently improved and the fibers of small fineness, e.g., filament, staple, monofilament, tow, etc. can be efficiently produced by spun bond and melt blown processes. Further, the third molding materials can be used suitably as molding materials for films, sheets, injection moldings, etc. including conjugates with other polymers such as polypropylene, and various fibers such as dyeable type, colored type, modified cross section type and hollow type.

The molded articles in the present invention include those formed from the above propylene composition (first molding material) such as films, sheets, injection moldings, extrusion moldings, blow moldings, fibers, etc.

The films in the present invention are those having a thickness of usually 1 to 150 $\mu$m, preferably 10 to 90 $\mu$m, formed from the above propylene composition (first molding material).

As a method of forming a film, known T-die and tubular methods, etc. can be employed. A film-forming condition which can be used is similar to a conventional film-forming condition of a polypropylene film. The melt-extruded film is quenched at 90° C. or below. Quenching from a temperature exceeding 90° C. is not desirable, since it embrittles the film and lowers a low temperature heat-sealing property.

The films include any of unstretched films, uniaxially stretched films and biaxially oriented films.

Those films have excellent-heat resistance and stiffness, and high transparency, since they comprise the propylene/ethylene random copolymer as a base resin.

Another embodiment of the present film is a composite polypropylene film comprising the above-mentioned film layer and other polypropylene film layer.

The composite polypropylene films include, e.g., those formed by a method of extruding and laminating an unstretched film of the first molding material on another polypropylene film, e.g., a crystalline polypropylene film and those formed by co-extruding the first molding material and other polypropylene composition by T-die and tubular methods. These composite polypropylene films may be any of unstretched films, uniaxially stretched films and biaxially oriented films.

Particularly preferred embodiment of the present composite polypropylene film is an stretched multi-layer polypropylene film having a heat-seal layer comprising a film layer formed from the first molding material on at least one surface of the base layer comprising a crystalline polypropylene as a main component.

The multi-layer polypropylene film is the film which is stretched to the longitudinal direction usually by 3–6 times, preferably 4.0–5.5 times. Preferably, it is also stretched to the transverse direction by 6–10 times, preferably 7.0–9.0 times. In particular, the film, which is excellent in stiffness, is prepared by stretching to the longitudinal direction by 4.0–5.5 times.

The thickness of the multi-layer polypropylene film is chosen depending on the purpose, but is usually 5 to 100 $\mu$m, preferably 10 to 60 $\mu$m.

The thickness of the heat-seal layer is chosen depending on the purpose, but is usually 0.5 to 10 $\mu$m, preferably 0.7 to 5.0 $\mu$m.

The heat-seal layer is the film layer formed from the above propylene composition (first molding material).

The basic layer is a film layer formed from a molding material which comprises a crystalline polypropylene as a main component with a desired additive incorporated, the crystalline polypropylene having higher melting point than the propylene/ethylene random copolymer which is a base resin of the heat-seal layer.

As the crystalline polypropylenes which are a main component for the basic layer, known polypropylenes for film satisfying the condition of the melting point as mentioned above can be used with no particular limitation, but polypropylenes are preferably used which have an isotactic index (I.I.: boiling n-heptane insoluble component) of 75% or more, preferably 85 to 99%.

More preferably, these crystalline polypropylenes have the density of 0.89 to 0.92 g/cm$^3$ and the melt flow rate (MFR) of 0.1 to 10 g/10 min.

Crystalline polypropylenes are usually homopolypropylenes, but propylene/olefin random copolymers can be used which contain an olefin monomer unit in the range not impairing the object of the present invention, e.g., not more than 5 mol %. Olefins copolymerizable with propylene include α-olefins of 2–20 carbons, e.g., ethylene, 1-butene, 1-pentene, 1-hexene, 1-heptene, 1-octene, 4-methyl-1-pentene, etc.

The processes of preparing crystalline polypropylenes can employ known processes using a Ziegler-Natta catalyst system or a metallocene catalyst system, with no particular limitation thereto.

The desired additives constituting the basic layer include, e.g., thermostabilizer, inorganic filler, slip agent, antistatic agent and the like. These can be used in the range not impairing the purpose of the present invention.

As the process of preparing the multi-layer polypropylene film, known processes can be employed which include, e.g., a process of co-extruding the molding material for the basic layer and the molding material for the heat-seal layer, followed by stretching, a process of laminating the heat-seal layer film on the basic layer film stretched to the longitudinal direction, followed by stretching to the transverse direction, and the like. As the method of stretching the film, known methods can be employed such as a tubular method, a tentering method and the like.

The stretched, multi-layer polypropylene films of the present invention are excellent in transparency, blocking resistance and heat-sealing properties, since the molding materials constituting the heat-seal layer comprise the propylene/ethylene random copolymer as a base resin.

The molded products of the present invention are injection moldings formed from the molding materials of the first and second embodiments as mentioned above. These injection moldings have high stiffness and heat resistance, and excellent transparency, since they comprise the propylene/ethylene random copolymer as a base resin.

In particular, the injection moldings formed from the molding material of the second embodiment, the propylene/ethylene random copolymer composition have better mechanical characteristics, in particular, flexural modulus and heat resistance, and further, better transparency than injection moldings formed from the first molding materials, since the second molding materials contain the α-crystal nucleating agent.

These moldings can be applied to sheets, containers, various industrial parts and the like.

EXAMPLE

The present invention is further illustrated by the following Examples and Comparative Examples.
(A) Propylene/ethylene Random Copolymer

Example 1

Preparation of Supported Metallocene Catalyst

A sufficiently dried 500 ml flask purged with nitrogen was charged with 0.39 g (0.889 mmol) of dimethylsilylene(2,3,5-trimethylcyclopentadienyl)(2',4',5'-trimethylcyclopentadienyl)zirconium dichloride and 267 mmol (in terms of Al atom) of a toluene solution of methylaluminoxane and the mixture was reacted for 10 minutes. To this reaction system were added 10 g of silica (Grace Devison) which was fired at 800° C. for 8 hrs and the mixture was stirred for 10 minutes. Subsequently, the mixture was heated and stirred at 70° C. for 9 hrs and, while evacuating the mixture under reduced pressure, a slight amount of $N_2$ was added through the bottom of the flask, thus evaporating the solvent. The resultant dry solid was cooled to ambient temperature overnight to afford a supported metallocene catalyst.

Preactivation of the Supported Metallocene Catalyst

A sufficiently dried 500 ml flask purged with nitrogen was charged with the total amount of the supported metallocene catalyst as prepared above and 250 ml of isopentane, and the mixture was cooled to 0° C. Then, prepolymerization was carried out by continuously feeding ethylene at a feed rate of 80 ml/min for 4 hrs to preactivate the supported metallocene catalyst. After preactivation of the supported metallocene catalyst was completed, a supernatant was separated by decantation, which was washed with additional 100 ml of isopentane. An operation for separating a supernatant by decantation was repeated four times. Drying at ambient temperature for 2 hrs gave 35 g of the preactivated, supported metallocene catalyst.

Production of Propylene/ethylene Random Copolymer

An autoclave having an internal volume of 630 L and sufficiently purged with nitrogen was charged with 120 L of n-hexane and 250 mmol of triethylaluminum, and the mixture was stirred for 5 minutes. To the mixture were added 25 g of the preactivated, supported metallocene catalyst as prepared above, which was elevated to 50° C. Subsequently, a propylene monomer was continuously fed so as to maintain a constant pressure of 1.32 MPa at 50° C., while feeding an ethylene monomer at a constant rate of 195 NL/hr to continue a copolymerization of propylene and ethylene for 10 hrs. After the polymerization time passed, the slurry obtained with the centrifuge was separated into a powder and a solvent, and the powder was dried to give 40 kg of the propylene/ethylene random copolymer.

Evaluation for Characteristics of Propylene/ethylene Random Copolymer

Each of the characteristics as defined above for the propylene/ethylene random copolymer as prepared above was analyzed or determined by the methods as defined.

The analytical result by $^{13}$C-NMR spectroscopy showed that the ethylene content (Ew) was 2.0 wt %, the isolated ethylene content ($E_1$) was 0.882 (>0.83), and the 2,1- and 1,3-propylene units in a polymer chain were 0.29 mol %.

$^{13}$C-NMR spectrum of the propylene/ethylene random copolymer as prepared above is shown in FIG. 1.

The weight average molecular weight (Mw) determined by GPC was 1.37×10$^5$ g/mol and Mw/Mn was 1.7. The melt flow rate (MFR) was 34 g/10 min and the melting point (Tm) was 143.8° C.

Example 2

Production of Propylene/ethylene Random Copolymer

Propylene and ethylene were copolymerized under the same condition as in Example 1, except that the feed rate of the ethylene monomer was 230 NL/hr. Subsequently, the same after-treatment as in Example 1 gave 45 kg of the propylene/ethylene random copolymer.

Evaluation for Characteristics of Propylene/ethylene/random Copolymer

The analytical result of the propylene/ethylene/random copolymer as prepared above by $^{13}$C-NMR spectroscopy showed that the ethylene content (Ew) was 3.1 wt %, the isolated ethylene content ($E_1$) was 0.860 (>0.819), and the 2,1- and 1,3-propylene units in a polymer chain were 0.28 mol %.

Figure 2:
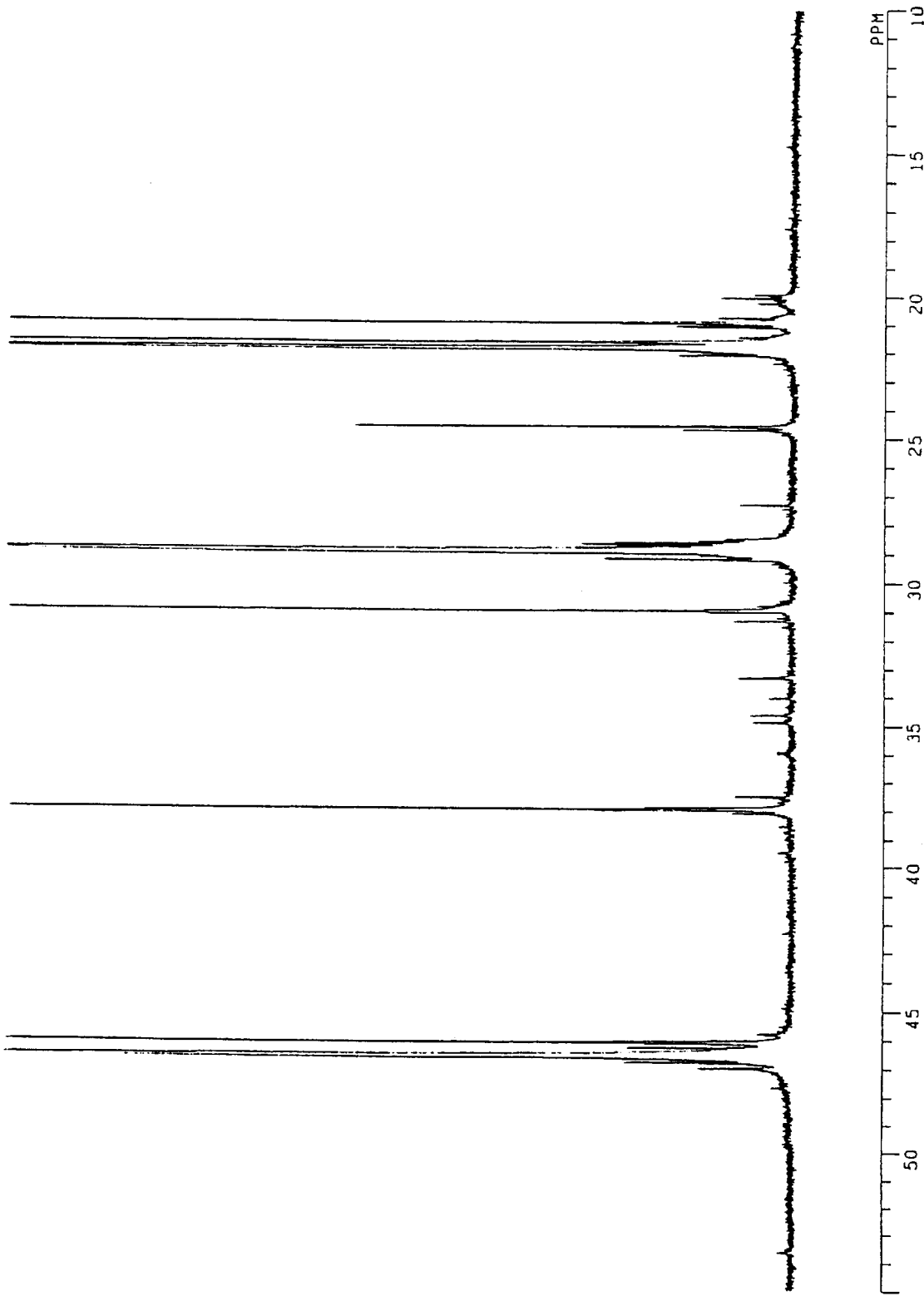
FIG. 2 is $^{13}$C NMR spectrum of the propylene/ethylene random copolymer produced in Example 2.

$^{13}$C-NMR spectrum of the propylene/ethylene random copolymer as prepared above is shown in FIG. 2.

The weight average molecular weight (Mw) determined by GPC was $1.211 \times 10^5$ g/mol and Mw/Mn was 2.2. The melt flow rate (MFR) was 43 g/10 min and the melting point (Tm) was 138.5° C.

Further, per cent extraction of the resultant copolymer with boiling n-pentane was 0.4% as determined by the following method.

Method for the Determination of Percent Extraction with Boiling n-pentane

The copolymer powders were formed into a film of 100×100×1 mm without pressure using a heating press at 200° C., and the film was cooled through a cooling press. Then it was cut into a size of 20×20×1 mm and crushed to 500 μm (32 mesh) pass using a crusher. 2 g of a sample having a size of 500 μm pass were extracted with boiling n-pentane for 3 hrs using a Soxhlet extractor. After extraction, the sample was dried in vacuo at 80° C. for 2 hrs and weighed. Per cent extraction with boiling n-pentane was calculated from the difference in weight of the sample before and after extraction.

Example 3

Production of Propylene/ethylene Random Copolymer

Propylene and ethylene were copolymerized under the same condition as in Example 1, except that the feed rate of the ethylene monomer was 680 NL/hr. Subsequently, the same after-treatment as in Example 1 gave 44 kg of the propylene/ethylene random copolymer.

Evaluation for Characteristics of Propylene/ethylene Random Copolymer

The analytical result of the propylene/ethylene random copolymer as prepared above by $^{13}$C-NMR spectroscopy showed that the ethylene content (Ew) was 7.0 wt %, the isolated ethylene content ($E_1$) was 0.800 (>0.780), and the 2,1- and 1,3-propylene units in a polymer chain were 0.30 mol %.

The weight average molecular weight (Mw) determined by GPC was $1.201 \times 10^5$ g/mol and Mw/Mn was 2.1. The melt flow rate (MFR) was 45 g/10 min and the melting point (Tm) was 110° C.

Comparative Example 1

Production of Propylene/ethylene Random Copolymer

A stainless polymerization reactor having an internal volume of 100 dm$^3$ and equipped with an agitator having a tilted impeller was purged with nitrogen and charged with 50 dm$^3$ of n-hexane, 2.0 mol (in terms of Al atom) of a toluene solution of methyl aluminoxane (concentration: 2 mol/dm$^3$) and a mixture of 0.09 mmol of dimethylsilylene(2,3,5-trimethylcyclopentadienyl)(2',4',5'-trimethylcyclopentadienyl)zirconium dichloride and 0.01 mmol of its meso form, dimethylsilylene(2,3,5-trimethylcyclopentadienyl)(2',3',5'-trimethylcyclopentadienyl)zirconium dichloride together with 0.5 dm$^3$ of toluene.

The internal temperature of the polymerization reactor was elevated to 45° C., a mixed gas of 91.9 mol % propylene, 8.8 mol % ethylene and 0.1 mol % hydrogen was continuously fed to the reactor at a rate of 8 dm$^3$/min to continue a copolymerization reaction of propylene and ethylene for 4 hrs. During the copolymerization reaction, a portion of the mixed gas present at the gas phase portion within the reactor was continuously evacuated so that the temperature of the reactor was kept at 45° C. and the pressure was kept at 0.4 MPa.

After completion of the polymerization reaction, unreacted propylene, ethylene and hydrogen were discharged from the polymerization reactor, 3 dm$^3$ of 2-propanol were charged into the reactor and stirring was continued at 30° C. for 10 minutes to deactivate the catalyst. Subsequently, 0.2 dm$^3$ of hydrochloric acid in 12-mol/dm$^3$ concentration and 8 dm$^3$ of methanol were added and stirring was continued at 60° C. for 30 minutes. After completion of stirring, an aqueous phase portion was removed from the bottom of the polymerization reactor, hydrochloric acid and methanol were added in the same amount as described above and a similar operation was repeated. 0.02 dm$^3$ of an aqueous sodium hydroxide solution in concentration of 5 mol/dm$^3$, 2 dm$^3$ of water and 2 dm$^3$ of methanol were added and stirring was continued at 30° C. for 10 minutes. After removal of the aqueous phase portion from the bottom of the reactor, 8 dm$^3$ of water were added, stirring was continued at 30° C. for 10 minutes and the operation for removal of the aqueous phase portion from the bottom of the reactor was repeated two times.

From the solution taken out of the polymerization reactor, the solvent was distilled off at 70° C. under reduced pressure, the solution was cooled to 25° C. and 20 dm$^3$ of methanol were added to precipitate a propylene/ethylene random copolymer. Separation of the precipitate by filtration and drying gave the propylene/ethylene random copolymer.

Evaluation for Characteristics of Propylene/ethylene Random Copolymer

The analytical result of the propylene/ethylene random copolymer as prepared above by $^{13}$C-NMR spectroscopy showed that the ethylene content (Ew) was 10.18 wt %, the isolated ethylene content ($E_1$) was 0.713 (<0.748), and the 2,1- and 1,3-propylene units in a polymer chain were 0.20 mol %.

The weight average molecular weight (Mw) determined by GPC was $0.72 \times 10^4$ g/mol and Mw/Mn was 2.2. The melt flow rate (MFR) was 43 g/10 min and the melting point (Tm) was 115.3° C.

Comparative Example 2

Preparation of Supported Metallocene Catalyst

The supported metallocene catalyst was prepared by carrying out each treatment under the same condition as in Example 1, but using as the transition metal compound dimethylsilylenebis (2-methyl-4,5-benzoindenyl) zirconium chloride instead of dimethylsilylenebis(2,3,5-trimethylcyclopentadienyl)(2',4',5'-trimethylcyclopentadienyl)zirconium chloride in the preparation of the supported metallocene catalyst in Example 1.

Production of Propylene/ethylene Random Copolymer

The propylene/ethylene random copolymer was produced by copolymerization of propylene and ethylene under the same condition as in Example 1 and a similar after-treatment as in Example 1, provided that the autoclave used in Example 1 was charged with the supported metallocene catalyst as prepared above, the amount of n-hexane was 170 L, the polymerization pressure was 1.08 MPa and the feed rate of the ethylene monomer was 130 NL/hr.

Evaluation for Characteristics of Propylene/ethylene Random Copolymer

The analytical result of the propylene/ethylene random copolymer as prepared above by $^{13}$C-NMR spectroscopy showed that the ethylene content (Ew) was 1.37 wt %, the isolated ethylene content ($E_1$) was 0.790 (<0.836), and the 2,1- and 1,3-propylene units in a polymer chain were 1.27 mol %.

Figure 3:
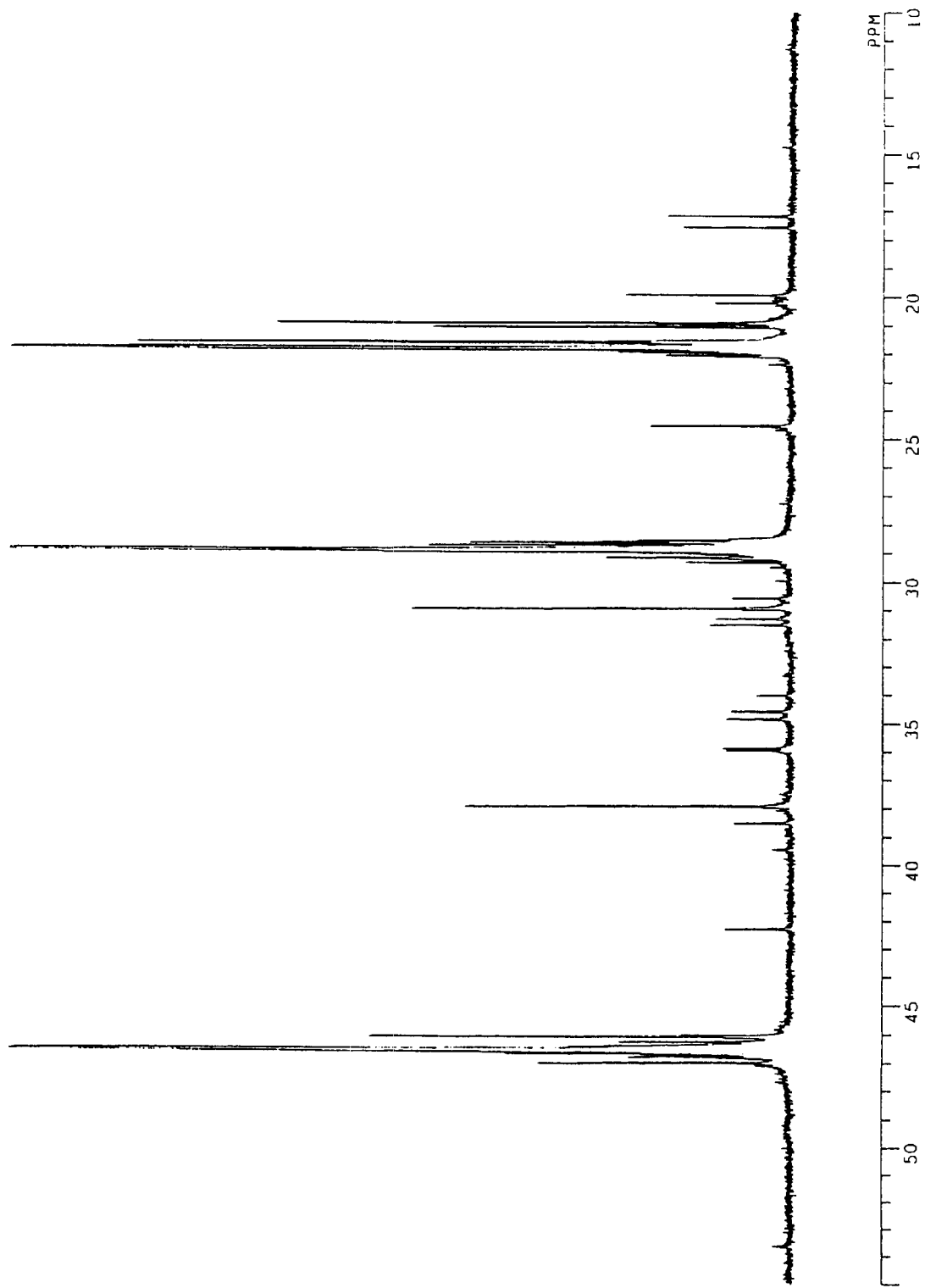
FIG. 3 is $^{13}$C NMR spectrum of the propylene/ethylene random copolymer produced in Comparative Example 2.
Figure 4:
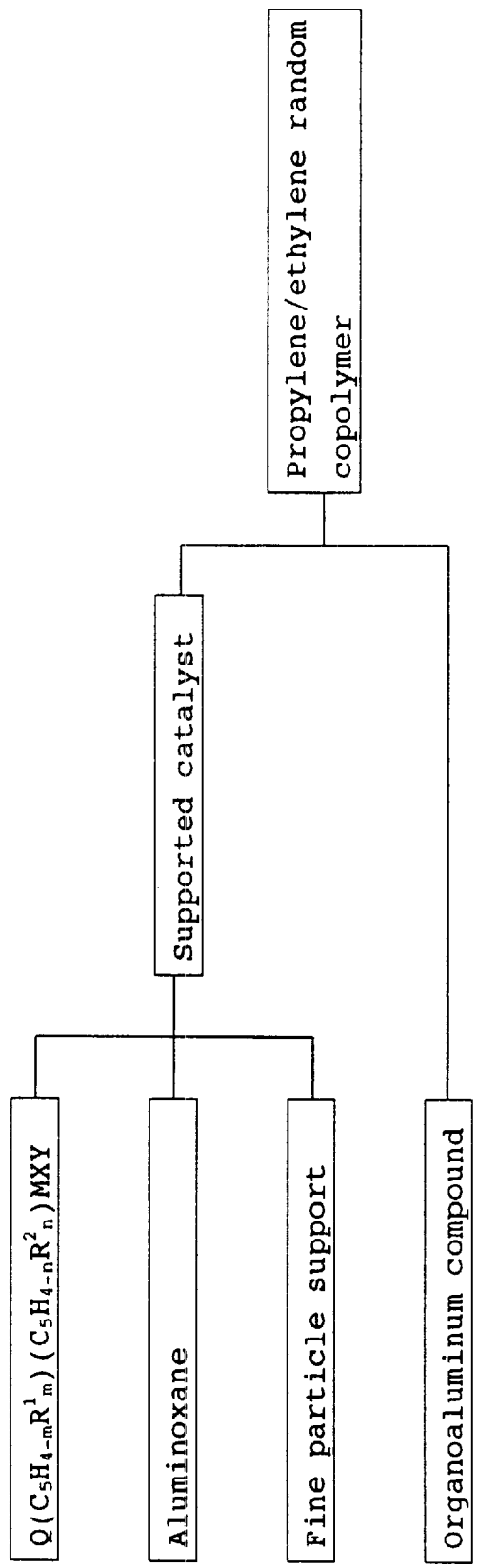
FIG. 4 is a flow sheet of the process for the production of the propylene/ethylene random copolymer according to the present invention.

$^{13}$C-NMR spectrum of the propylene/ethylene random copolymer as prepared above is shown in FIG. 3.

The weight average molecular weight (Mw) determined by GPC was 1.270×10$^5$ g/mol and Mw/Mn was 2.0. The melt flow rate (MFR) was 40 g/10 min and the melting point (Tm) was 139.7° C.

Comparative Example 3
Production of Propylene/ethylene Random Copolymer 20 kg of the propylene/ethylene/1-butene random copolymer were produced using a titanium trichloride catalyst system in accordance with the method disclosed in Japanese Patent Kokai 56-143207.
Evaluation for Characteristics of Propylene/ethylene Random Copolymer The analytical result of the propylene/ethylene/1-butene random copolymer as prepared above by $^{13}$C-NMR spectroscopy showed that the ethylene content (Ew) was 3.1 wt %, the 1-butene content was 1.25 wt %, the isolated ethylene content (E$_1$) was 0.790 (<0.819), and the 2,1- and 1,3-propylene units were not observed in a polymer chain.

The weight average molecular weight (Mw) determined by GPC was 1.35×10$^5$ g/mol and Mw/Mn was 2.5. The melt flow rate (MFR) was 4.0 g/10 min and the melting point (Tm) was 139.5° C.

Further, per cent extraction of the copolymer with boiling n-pentane was 1.2% as determined by the method described in Example 2.

The characteristics of the propylene/ethylene random copolymers produced in the above Examples and Comparative Examples are shown in Table 1.

TABLE 1

|  | Example | | | Comparative Example | | |
| --- | --- | --- | --- | --- | --- | --- |
|  | 1 | 2 | 3 | 1 | 2 | 3 |
| Ethylene content (Ew) wt % | 2.0 | 3.06 | 7.0 | 10.18 | 1.37 | 3.1 |
| 1-butene content wt % | — | — | — | — | — | 1.25 |
| Isolated ethylene content (E$_1$) | 0.884 | 0.860 | 0.800 | 0.713 | 0.790 | 0.79 |
| Inverted unit mol % | 0.29 | 0.28 | 0.30 | 0.20 | 1.27 | not detected |
| Weight average molecular weight (Mw) × 10$^{-5}$ | 1.37 | 1.21 | 1.201 | 0.72 | 1.27 | 1.35 |
| Molecular weight distribution (Mw/Mn) | 1.7 | 2.2 | 2.1 | 2.2 | 2.0 | 2.5 |
| Melt flow rate (MFR) g/10 min | 34 | 43 | 45 | — | 40 | 4.0 |
| Melting point (Tm) ° C. | 143.8 | 138.5 | 110.0 | 115.3 | 139.7 | 139.5 |

In the table, the inverted unit means the 2,1- and 1,3-propylene units present in the polymer chain.

As shown in Table 1, the propylene/ethylene random copolymers produced by copolymerizing ethylene and propylene in the presence of the supported metallocene catalyst having the transition metal compound and aluminoxane or the reaction product thereof supported on a fine particle support and the organoaluminum compound satisfy the following equation in respect of the relationship between the isolated ethylene content (E$_1$) and the ethylene content (Ew), thus having high randomness.

$E_1 > 0.85 - 0.01 Ew$

On the other hand, the copolymer having the ethylene content (Ew) exceeding 10 wt % produced from an intimate mixture system of the same transition metal compound, aluminoxane and organoaluminum compound (Comparative Example 1), the copolymer produced from the supported metallocene catalyst system wherein the transition metal compound not included in the above-mentioned transition metal compound and aluminoxane are supported (Comparative Example 2) and the copolymer produced from conventional Ziegler-Natta catalyst system do not satisfy the above equation in respect of the isolated ethylene content.

(B) Molding Materials

Example 4
Propylene Composition (First Molding Material)

Each of the propylene/ethylene random copolymers produced in Examples 1–3 and Comparative Examples 1–3 was used as the base resins PE1, PE2, PE3, CPE1, CPE2 and CPE3, respectively, to which were incorporated, based on 100 parts by weight of the base resin, 0.05 part by weight of tetrakis[methylene(3,5-di-t-butyl-4-hydroxyl hydrocinnamate)]methane as an antioxidant, 0.1 part by weight of tris(2,4-di-t-butylphenyl)phosphite as an antioxidant and 0.1 part by weight of calcium stearate as a neutralizer, and further, 0.05 part by weight of 1,3-bis(t-butyl-peroxyisopropyl)benzene as a radical generator for CPE3, and they were mixed. The mixture was pelletized using a single screw extruder having a screw diameter of 40 mm set at an extrusion temperature of 190° C. to prepare the propylene compositions (first molding material) 1M1–1M3 which comprise the propylene/ethylene random copolymer and the desired additive component, and the molding materials 1CM1–1CM3 for comparison. MFR of the molding material 1CM3 for comparison was 43 g/10 min.

Each molding material as prepared was provided for the manufacture of the molded article as mentioned later.

Example 5
Propylene/ethylene Random Copolymer Composition (Second Molding Material)

To the base resin PE1 comprising the propylene/ethylene random copolymer prepared in Example 1 were added, based on 100 parts by weight of the base resin, 0.03 part by weight of tetrakis[methylene(3,5-di-t-butyl-4-hydroxyl hydrocinnamate)]methane as an antioxidant, 0.03 part by weight of bis(2,3-di-t-butyl-4-methylphenyl)pentaerythritol diphosphite as an antioxidant and 0.09 part by weight of calcium stearate as a neutralizer, and further, 0.15 part by weight of sodium 2,2'-methylene-bis(4,6-di-t-butylphenyl) phosphate as an α-nucleating agent for the molding material 2M1, 0.3 part by weight of the α-nucleating agent for 2M2, with no addition of the α-nucleating agent to the reference material 2RM1, and they were mixed. The mixture was pelletized under the same condition using the same apparatus as in Example 4 to prepare the propylene/ethylene random copolymer compositions (second molding materials) 2M1 and 2M2 as well as the reference material 2RM1.

The second molding materials as prepared were provided for the manufacture of the injection molded articles which will be mentioned later.

Example 6
Modified Propylene/ethylene Random Copolymer Composition (Third Molding Material)

To the base resin PE1 comprising the propylene/ethylene random copolymer prepared in Example 1 were added, based on 100 parts by weight of the base resin, 0.07 part by weight of 1,3,5-trimethyl-2,4,6-tris(3,5-di-t-butyl-4-hydroxybenzyl)benzene as an antioxidant and 0.1 part by weight of calcium stearate as a neutralizer. To this mixture was further added 1,3-bis(t-butyl-peroxyisopropyl)benzene as a radical generator in an amount of 0.02 part by weight, 0.04 part by weight, 0.10 part by weight and 0.15 part by weight, respectively, and they were mixed. The mixture was pelletized using a single screw extruder having a screw diameter of 40 mm set at an extrusion temperature of 230° C. to prepare the modified propylene/ethylene random copolymer compositions (third molding materials) 1M1–3M4. Further, the reference molding material 3RM1 was prepared by a similar treatment without any radical generator.

Each of the molding materials as prepared above was determined for the melt flow rate (MFR), melting point (Tm) and molecular weight dispersity (Mw/Mn) by the above-mentioned methods.

The composition of each molding material and the determined results of the above physical properties are shown in Table 2.

TABLE 2

|  | Example | | | | Reference Example |
| --- | --- | --- | --- | --- | --- |
| Molding material | 3M1 | 3M2 | 3M3 | 3M4 | 3RM1 |
| Composition | | | | | |
| Base resin | PE1 | PE2 | PE3 | PE4 | PE1 |
| Part by weight | 100 | 100 | 100 | 100 | 100 |
| Radical generator | BBPIB | BBPIB | BBPIB | BBPIB | — |
| Part by weight | 0.02 | 0.04 | 0.10 | 0.15 | 0 |
| Antioxidant | TTBHB | TTBHB | TTBHB | TTBHB | TTBHB |
| Part by weight | 0.07 | 0.07 | 0.07 | 0.07 | 0.07 |
| Neutralizer | StACa | StACa | StACa | StACa | StACa |
| Part by weight | 0.1 | 0.1 | 0.1 | 0.1 | 0.1 |
| Physical properties | | | | | |
| Melt flow rate (MFR) (g/10 min) | 43.2 | 72.0 | 160 | 161 | 34 |
| Melting point (Tm) (° C.) | 143.8 | 143.8 | 143.7 | 143.7 | 143.8 |
| Molecular weight distribution (Mw/Mn) | 1.7 | 1.8 | 1.8 | 1.8 | 1.7 |

The abbreviations in the table refers to the following.

BBPIB: 1,3-bis(t-butyl-peroxyisopropyl)benzene TTBHB: 1,3,5-trimethyl-2,4,6-tris(3,5-di-t-butyl-4-hydroxybenzyl)benzene StACa: calcium stearate As shown in Table 2 above, in the third molding materials in which the radical generator was specifically incorporated, the melt flow rate (MFR) varies depending on the amount of the generator added, but the melting point (Tm) and molecular weight distribution (Mw/Mn) of the propylene/ethylene random copolymer as the base resin were maintained.

This shows that the molding materials can be modified to have the processability suitable for various molding methods by incorporation of the radical generator and also that desired molded articles can be produced from these materials, while maintaining the heat resistance, stiffness and transparency originated from the propylene/ethylene random copolymer.

(C) Formed Articles

Example 7

Films Formed From First Molding Material

Preparation of Film

Each pellet prepared in Example 4 was formed into a film by a T-die method under the conditions wherein the melt extrusion temperature was 190° C., the temperature of a cooling roll was 30° C. and the line speed (take-off speed) was 20 m/min, to prepare the films 20 μm and 50 μm in thickness and 300 mm in width.

Evaluation of Film

Each of the resultant films was determined for the following physical properties.

Young's modulus (YM): Either lower value of the tensile strength values (unit: MPa) in MD (machine direction) and TD (transverse direction) measured for the film 20 μm in thickness according to ASTM D882.

Haze: Internal haze value measured for the film 50 μm in thickness according to ASTM D1003 (unit: %).

The composition of the molding material and the measured results of the physical properties are shown in Table 3.

TABLE 3

|  | Example | | | Comparative Example | | |
| --- | --- | --- | --- | --- | --- | --- |
| Molding material | 1M1 | 1M2 | 1M3 | 1CM1 | 1CM2 | 1CM3 |
| Composition | | | | | | |
| Base resin | PE1 | PE2 | PE3 | CPE1 | CPE2 | CPE3 |
| Part by weight | 100 | 100 | 100 | 100 | 100 | 100 |
| Antioxidant | TMBHM | TMBHM | TMBHM | TMBHM | TMBHM | TMBHM |
| Part by weight | 0.05 | 0.05 | 0.05 | 0.05 | 0.05 | 0.05 |
| Antioxidant | TBPP | TBPP | TBPP | TBPP | TBPP | TBPP |
| Part by weight | 0.1 | 0.1 | 0.1 | 0.1 | 0.1 | 0.1 |
| Neutralizer | StACa | StACa | StACa | StACa | StACa | StACa |
| Part by weight | 0.1 | 0.1 | 0.1 | 0.1 | 0.1 | 0.1 |
| Radical generator | | | | | | BBPIB |
| Part by weight | — | — | — | — | — | 0.05 |
| MFR (g/10 min) | — | — | — | — | — | 43 |
| Physical properties of film | | | | | | |
| Young's modulus (MPa) | 580 | 390 | 260 | 250 | 350 | 320 |
| Haze (%) | 0.2 | 0.2 | 0.1 | 0.3 | 0.3 | 0.9 |

TABLE 3-continued

|  | Example | | | Comparative Example | | |
|---|---|---|---|---|---|---|
| Molding material | 1M1 | 1M2 | 1M3 | 1CM1 | 1CM2 | 1CM3 |
| Physical properties of injection molded article | | | | | | |
| Flexural modulus (MPa) | 930 | 840 | — | — | — | 730 |
| Heat distortion temperature (HDT) (° C.) | 103.9 | 90.9 | — | — | — | 88.7 |
| Haze (%) | 52.4 | 39.1 | — | — | — | 60.3 |

In the table, (–) represents "not added" or "not determined".

The abbreviation in the table refers to the following.
TMBHM: tetrakis[methylene(3,5-di-t-butyl-4-hydroxyl hydrocinnamate)]methane
TBPP: tris(2,4-di-t-butylphenyl)phosphite
StACa: calcium stearate
BBPIB: 1,3-bis(t-butyl-peroxyisopropyl)benzene As shown in Table 3 above, the films formed from the first molding materials comprising the present propylene/ethylene random copolymer as a base resin have excellent transparency (haze) due to high randomness of the propylene/ethylene random copolymer, as compared with those formed from the comparative materials, although their mechanical properties cannot simply be compared because the first molding materials are different from the comparative materials in the ethylene contents.

In particular, the film formed from the molding material 1M2 is excellent in heat-sealing property, since per cent extraction with boiling n-pentane of the base resin, propylene/ethylene random copolymer PE2 prepared in Example 2 is as low as 0.4%. Further, a component extracted with oil is little. Thus the film formed from 1M2 is suitable for food packaging film.

Example 8
Stretched Multi-layer Polypropylene Film
Preparation of Biaxially Oriented, Multi-layer Polypropylene Film As a crystalline polypropylene film for a base layer, there were prepared polypropylene pellets (Chisso Polypro HF 1080, manufactured by Chisso Co., Ltd.) having the melt flow rate (MFR) of 2.5 g/10 min, the density (according to JIS K6758) of 0.90 g/cm$^3$, the isotactic index (I.I.) of 97% and the per cent extraction with boiling n-pentane of 0.5%.

The polypropylene pellets were fed to an extruder with a bore of 65 mmφ, melted at 250° C., extruded from a T-die and cooled at a cooling temperature of 50° C. to prepare a base sheet 1 mm in thickness.

Subsequently, the propylene composition 1M2 prepared in Example 4 was fed to an extruder with a bore of 65 mmφ, melt at 200° C. and extruded at a thickness of 120 μm on the base sheet as prepared above to prepare a laminated two-layer sheet.

Subsequently, the resultant two-layer sheet was preheated at 158° C. for 120 seconds and then stretched 4.5 times in a machine direction and 8.8 times in a transverse direction at a stretching speed of 10 m/min using a pantograph type biaxially orienting apparatus to prepare a biaxially oriented, multi-layer polypropylene film F1 having a total thickness of 28 μm and a heat-seal layer thickness of 3 μm.

Further, the multi-layer polypropylene film CF1 for comparison was prepared by the same treatment as mentioned above, but substituting the comparative composition 1CM3 prepared in Example 4 for the heat-seal layer 1M2.

Evaluation of Biaxially Oriented, Multi-layer Polypropylene Film

The biaxially oriented, multi-layer polypropylene films as prepared above were determined for the following physical properties.

Haze: the same as mentioned above.

Degree of blocking: Two test pieces 7 cm in length by 2 cm in width were cut off from the films as prepared above, the test pieces were superposed by 2 cm at each end, the surfaces of the heat-seal layer being in contact with each other, and a square weight of 1 kg having a base of 2 cm×2 cm was put on the superposed area of the test pieces. After the weighted test pieces were left in a thermostat at 40° C. for 24 hrs, the superposed area was determined for a shearing peel strength using a tensile tester (unit: N/4 cm$^2$).

Heat-seal strength: Each surface of the heat-seal layer of the films was heat-sealed in 10 mm width under the conditions of a heat-seal temperature which was 10° C. higher than the melting points (Tm) of the propylene compositions (1M2, 1CM3), a seal pressure at 0.1 MPa and a seal time of 1 sec. The heat-sealed films were cut out in a strip 15 mm in width to prepare a test piece. The test piece was determined for 90° peel strength at the seal area using a tensile tester (unit: N/15 mm).

The result of the determined physical properties is shown in Table 4.

TABLE 4

|  | Example | Comparative Example |
|---|---|---|
| Film | F1 | CF1 |
| Heat-seal layer | 1M2 | 1CM3 |
| Haze (%) | 0.8 | 0.8 |
| Degree of blocking (N/cm$^2$) | 4.4 | 7.9 |
| Heat-seal strength (N/15 mm) | 3.5 | 3.4 |

Table 4 shows that the biaxially oriented, multi-layer polypropylene film using as a heat-seal layer the film layer formed from the first molding material comprising the present propylene/ethylene random copolymer as a base resin is largely improved in anti-blocking property, as compared with the prior biaxially oriented film using as a heat-seal layer the film layer comprising as a base resin the copolymer prepared from a Ziegler-Natta catalyst system.

The present film is also suitable for food packaging, since it uses the molding material 1M2 which is low in per cent extraction with boiling n-pentane.

Example 9
Injection Molded Article From the First Molding Material

The pellets 1M1, 1M2 and 1CM3 prepared in Example 4 were respectively injection-molded at a resin temperature of 200° C. and at a mold temperature of 50° C. using an injection molding machine having a screw diameter of 40 mm, to prepare a JIS type test piece.

Evaluation of Injection-molded Articles

Each of the resultant injection-molded articles was determined for the following physical properties and the result was shown in Table 3.

Flexural modulus: Value determined according to JIS K7203 (unit: MPa).

Heat distortion temperature: Value determined under a load of 0.451 MPa according to JIS K7207 (unit: °C.).

Haze: Internal haze value determined for a test piece 1 mm in thickness according to JIS K7105 (unit: %).

As shown in Table 3 above, the injection-molded articles molded from the first molding materials are excellent in transparency, as compared with the article molded from the comparative material 1CM3 based on the copolymer prepared from the prior Ziegler-Natta catalyst system, although their mechanical properties cannot be compared simply as in the film.

Example 10

Injection-molded Article From the Second Molding Material

The pellets prepared in Example 5 were injection-molded under the same condition using the same apparatus as in Example 9, to prepare a JIS type test piece.

The resultant injection-molded articles were determined for similar properties as in Example 9.

The composition of the molding material and the determined result are shown in Table 5.

TABLE 5

| | Example | | Reference Example |
|---|---|---|---|
| Molding material | 2M1 | 2M2 | 2CM1 |
| Composition | | | |
| Base resin | PE1 | PE1 | PE1 |
| Part by weight | 100 | 100 | 100 |
| Antioxidant | TMBHM | TMBHM | TMBHM |
| Part by weight | 0.03 | 0.03 | 0.03 |
| Antioxidant | BBMPP | BBMPP | BBMPP |
| Part by weight | 0.03 | 0.03 | 0.03 |
| Neutralizer | StACa | StACa | StACa |
| Part by weight | 0.09 | 0.09 | 0.09 |
| α-Nucleating agent | MBBPNa | DMBS | — |
| Part by weight | 0.15 | 0.30 | 0 |
| Physical properties | | | |
| Melt flow rate (MFR) (g/10 min) | 34 | 35 | 34 |
| Flexural modulus (MPa) | 1150 | 1050 | 930 |
| Heat distortion temperature (HDT) (° C.) | 114.0 | 113.8 | 103.9 |
| Haze (%) | 40.1 | 13.1 | 52.4 |

The abbreviation in the table refers to the following.
TMBHM: tetrakis[methylene(3,5-di-t-butyl-4-hydroxyl hydrocinnamate)]methane
BBMPP: bis(2,3-di-t-butyl-4-methylphenyl)pentaerythritol-di-phosphite
StACa: calcium stearate
MBBPNa: sodium-2,2'-methylene-bis(4,6-di-t-butylphenyl) phosphate
DMBS: 1,2,3,4-di-(p-methylbenzylidene)sorbitol As shown in Table 5, the injection-molded articles molded from the second molding material in which the α-crystal nucleating agent was specifically incorporated are largely improved in all of the flexural modulus, heat distortion temperature and transparency, as compared with the system in which the α-crystal nucleating agent was not incorporated.

Effect of the Invention

As mentioned above, the present invention provides the propylene/ethylene random copolymer which is very high in randomness. This copolymer is suitable for the base resin for the manufacture of the molded articles which are excellent in heat resistance and stiffness, and the articles molded therefrom have exceedingly high transparency.

Accordingly, the molding materials comprising the present propylene/ethylene random copolymer as a base resin can be applied to various molding methods such as blow molding, injection molding, extrusion molding, etc. by choice of additive components, and can be used in a wide range of the molding fields such as films, sheets, containers, various parts, fibers, etc.

What is claimed is:

1. A propylene/ethylene random copolymer, wherein:
   an ethylene content (Ew) is 0.1–10 wt %,
   a relationship between an isolated ethylene content ($E_1$) and the ethylene content (Ew) is represented by the following equation:

$$E_1 > 0.85 - 0.01 Ew$$

2,1- and 1,3-propylene units present in the polymer chain are 0–1 mol %,
   a weight average molecular weight (Mw) is in the range of 40,000–1,000,000, and a ratio (Mw/Mn) of the weight average molecular weight (Mw) to a number average molecular weight (Mn) is in the range of 1.5–3.8.

2. The copolymer of claim 1 wherein the copolymer has the melting point (Tm) in the range of 100–160° C.

3. The copolymer of claim 1 wherein the copolymer is produced by copolymerizing propylene and ethylene in the presence of a supported metallocene catalyst which comprises a transition metal compound and an aluminoxane or a reaction product thereof supported on a fine particle support, and an organoaluminum compound, and further the transition metal compound is represented by the following formula

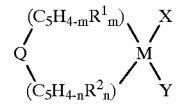

wherein M represents a transition metal selected from the group consisting of titanium, zirconium and hafnium; X and Y may be the same or different and each represents a hydrogen, a halogen or a hydrocarbyl radical; $(C_5H_{4-m}R^1_m)$ and $(C_5H_{4-n}R^2_n)$ represent a substituted cyclopentadienyl group in which m and n are an integer of 1–3; $R^1$ and $R^2$ may be the same or different and each represents a hydrocarbyl radical of 1 to 20 carbons or a silicone-containing hydrocarbyl radical, with the proviso that the position of $R^1$ and $R^2$ on the cyclopentadienyl ring gives a configuration wherein any symmetry plane containing M each other is absent; and Q is a divalent hydrocarbyl radical, an unsubstituted silylene group and a hydrocarbyl-substituted silylene group.

4. The copolymer of claim 3 wherein at least one of the substituents $R^1$ and $R^2$ in the transition metal compound is attached to a carbon adjacent to the carbon attached to Q in the cyclopentadienyl ring.

5. The copolymer of claim 3 wherein the transition metal compound is dimethylsilylene(2,3,5- trimethylcyclopentadienyl)(2',4',5'-trimethylcyclopentadienyl)zirconium dichloride.

6. The copolymer of claim 3 wherein the supported metallocene catalyst has been pre-activated by preliminary polymerization with small amounts of olefins.

7. A propylene composition comprising the propylene/ethylene random copolymer of claim 1 and a desired additive component.

8. A propylene composition comprising the propylene/ethylene random copolymer of claim 1, an α-crystal nucleating agent in an amount of 0.0001–1 part by weight based on 100 parts by weight of the copolymer and a desired additive component.

9. A propylene composition comprising the propylene/ethylene random copolymer of claim 1, a radical generator in an amount of 0.001–0.5 part by weight based on 100 parts by weight of the copolymer and a desired additive component.

10. A propylene composition of claim 9 wherein the radical generator is 2,5-dimethyl-2,5-di(t-butylperoxy) hexane, 2,5-dimethyl-2,5-di(t-butylperoxy)hexyne-3, 1,3-bis(t-butylperoxyisopropyl) benzene or a mixture thereof.

11. A propylene composition modified by melt-kneading the composition of claim 9 at a temperature of 150–300° C.

12. A molded article formed from the propylene composition of claim 7.

13. A film formed from the propylene composition of claim 7.

14. A composite polypropylene film comprising a film layer formed from the propylene composition of claim 7 and other polypropylene film layer.

15. A stretched, multi-layer polypropylene film having a heat-seal layer comprising a film layer formed from the propylene composition of claim 7 on at least one surface of a base layer comprising a film containing a crystalline polypropylene as a main component.

16. The multi-layer polypropylene film of claim 15 wherein the crystalline polypropylene has not less than 75% of an isotactic index (I.I.).

17. The multi-layer polypropylene film of claim 15 wherein the crystalline polypropylene has a melt flow rate (MFR) of 0.1–10 g/10 min.

18. The multi-layer polypropylene film of claim 15 which is biaxially oriented.

19. An injection-molded article formed from the propylene composition of claim 7.

20. An injection-molded article formed from the propylene/ethylene random copolymer composition of claim 8.

* * * * *